United States Patent [19]

Chieu et al.

[11] Patent Number: 5,515,366
[45] Date of Patent: May 7, 1996

[54] METHOD AND APPARATUS FOR DIRECT COMMUNICATION IN A TDMA RADIO COMMUNICATION SYSTEM

[75] Inventors: Trieu C. Chieu, Scarsdale; Anand Narasimhan, New York, both of N.Y.; Gary E. O'Neil, Raleigh, N.C.; Li-Cheng R. Zai, Tarrytown, N.Y.

[73] Assignee: International Business Machines Corporation, Armonk, N.Y.

[21] Appl. No.: 341,256

[22] Filed: Nov. 17, 1994

[51] Int. Cl.⁶ .................. H04J 4/00; H04Q 7/20
[52] U.S. Cl. .................. 370/50; 370/95.3; 455/34.2
[58] Field of Search .................. 370/18, 50, 95.1, 370/95.2, 95.3, 110.1; 340/825.03, 825.04; 379/58, 61, 63; 455/34.2, 53.1, 54.1

[56] References Cited

U.S. PATENT DOCUMENTS

| | | | |
|---|---|---|---|
| 4,354,229 | 10/1982 | Davis et al. | 364/200 |
| 4,914,650 | 4/1990 | Sriram | 370/60 |
| 5,025,486 | 6/1991 | Klughart | 455/54 |
| 5,068,916 | 11/1991 | Harrison et al. | 455/39 |
| 5,121,391 | 6/1992 | Paneth et al. | 370/95.1 |
| 5,124,984 | 6/1992 | Engel | 370/94.1 |
| 5,276,703 | 1/1994 | Budin et al. | 375/1 |

Primary Examiner—Melvin Marcelo
Attorney, Agent, or Firm—Jay P. Sbrollini

[57] ABSTRACT

Direct communication between a primary portable unit initiating the communication and a secondary portable unit is established utilizing two handshaking operations. The first handshaking operation is performed in the base station channel to establish initial contact between the primary and secondary portable units. After initial contact is made, the second handshaking operation is performed to establish communication in an unoccupied channel. The base station channel and the unoccupied channel may be a TDMA/TDD channel or a TDMA/FDD channel.

56 Claims, 15 Drawing Sheets

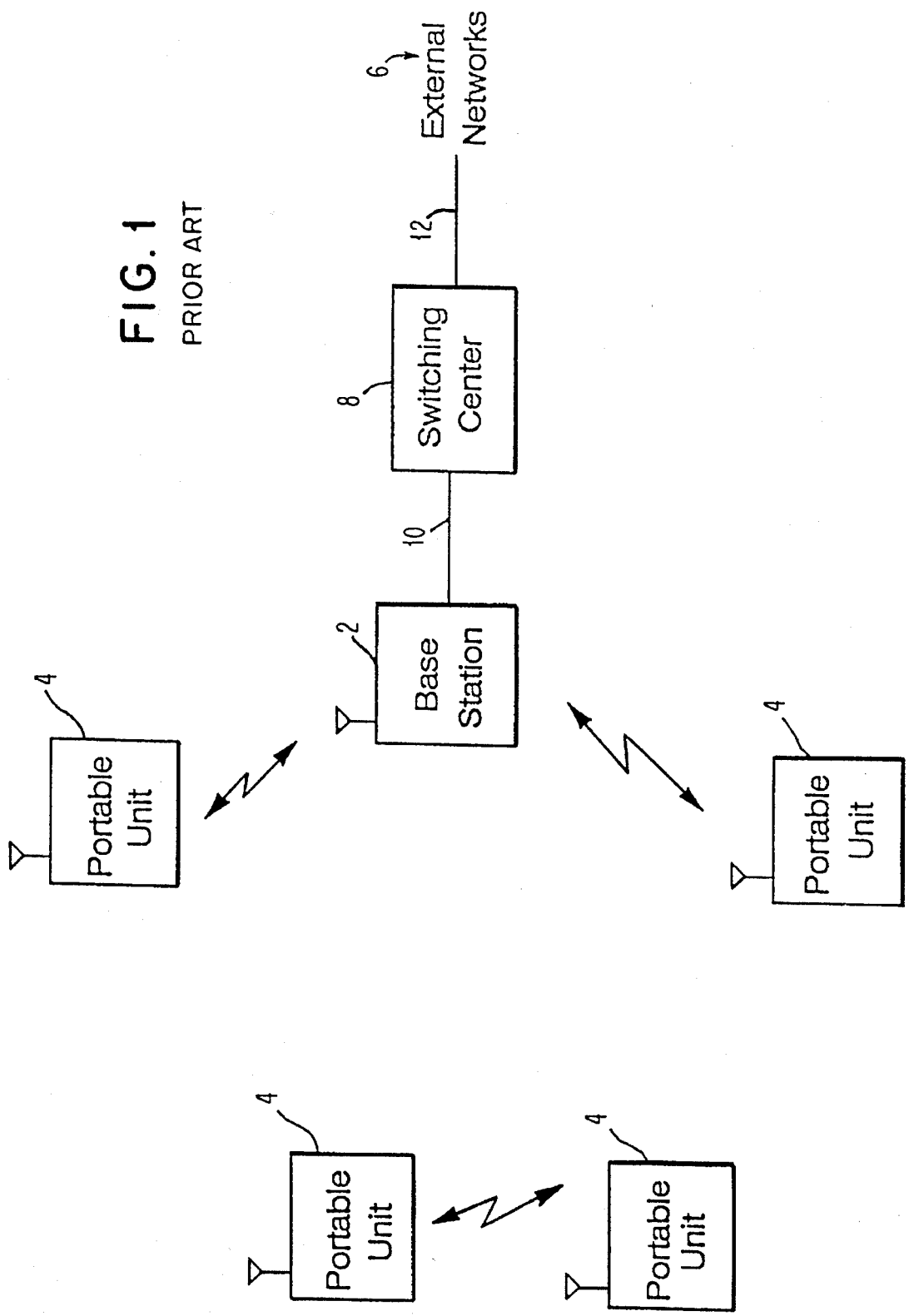

FIG. 2A
PRIOR ART

| PREAMBLE FIELD | SYNCHRONIZATION FIELD | ADDRESS FIELD | CONTROL FIELD | ERROR CONTROL FIELD |

FIG. 2B
PRIOR ART

| PREAMBLE FIELD | SYNCHRONIZATION FIELD | ADDRESS FIELD | KEY FIELD | CONTROL FIELD | ERROR CONTROL FIELD |

FIG. 2C
PRIOR ART

| PREAMBLE FIELD | SYNCHRONIZATION FIELD | DATA FIELD | CONTROL FIELD | ERROR CONTROL FIELD |

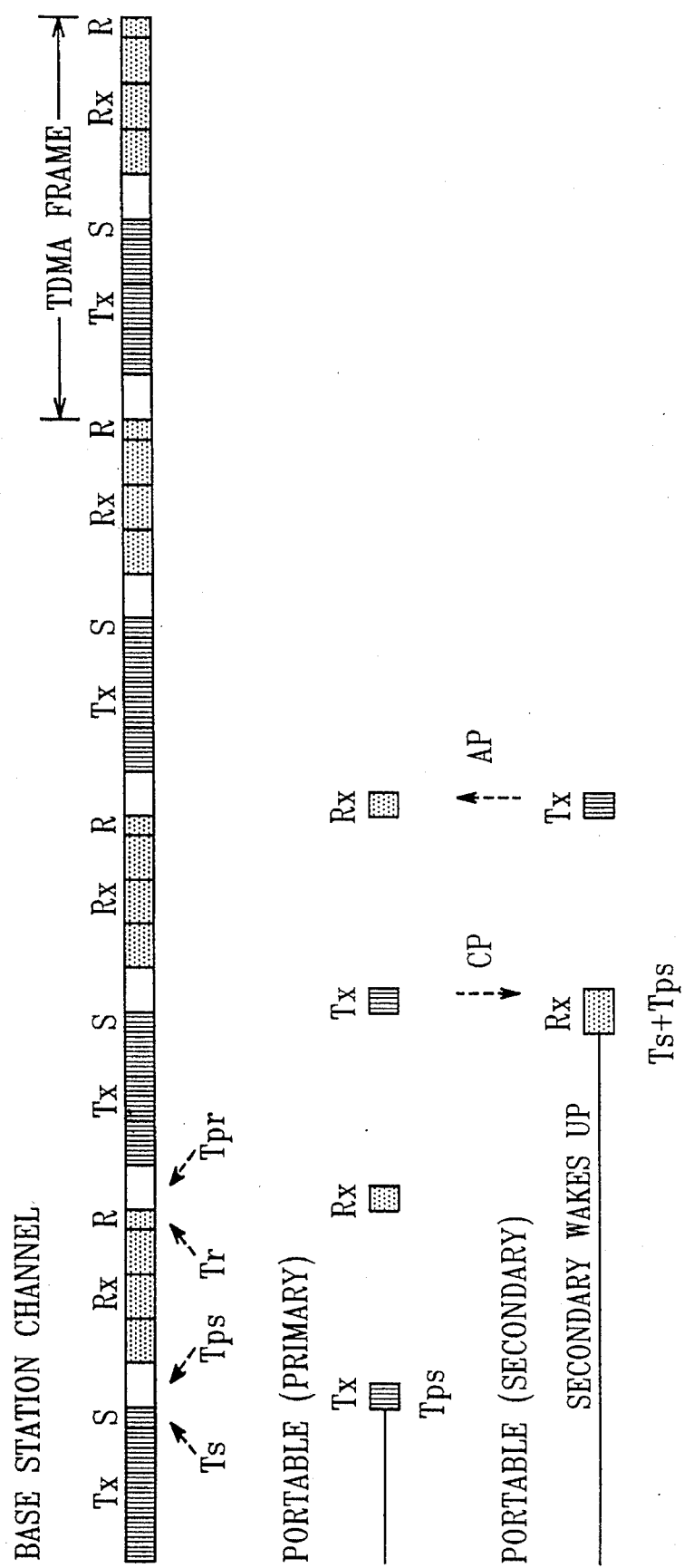

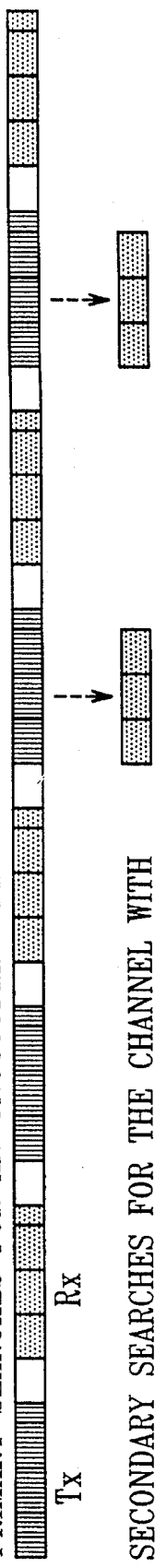
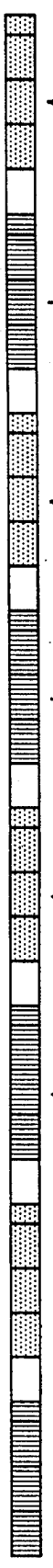

FIG. 3B
PRIMARY SEARCHES FOR AN UNOCCUPIED CHANNEL AND TRANSMITS BEACON SIGNALS
Tx  Rx
SECONDARY SEARCHES FOR THE CHANNEL WITH PRIMARY BEACON SIGNALS

FIG. 3C
PRIMARY LISTENS FOR BEACON ACKNOWLEDGEMENT SIGNAL FROM SECONDARY
SECONDARY TRANSMITS BEACON ACKNOWLEDGEMENT SIGNAL TO PRIMARY

FIG. 3D
PRIMARY BEGINS TO EXCHANGE DATA IN AN UNOCCUPIED CHANNEL
SECONDARY LISTENS FOR PRIMARY TO BEGIN EXCHANGE OF DATA IN AN UNOCCUPIED CHANNEL

FIG. 3E

PRIMARY SEARCHES FOR AN UNOCCUPIED CHANNEL AND TRANSMITS BEACON SIGNALS

Tx    Rx

PRIMARY
Tx → Rx

SECONDARY
Rx ← Tx

PRIMARY SEARCHES FOR AN UNOCCUPIED CHANNEL AND RECORDS AN UNOCCUPIED CHANNEL ID (UCID)

FIG. 3F

PRIMARY BEGINS TO EXCHANGE DATA IN AN UNOCCUPIED CHANNEL IDENTIFIED BY UCID

SECONDARY LISTENS FOR PRIMARY TO BEGIN EXCHANGE OF DATA IN THE UCID CHANNEL

BASE STATION DOWN-LINK FREQUENCY CHANNEL (f1)

BASE STATION UP-LINK FREQUENCY CHANNEL (f2)

FIG. 4B

PRIMARY SEARCHES FOR A PAIR OF UNOCCUPIED FREQUENCY CHANNELS AND TRANSMITS IN ONE OF THE CHANNELS.

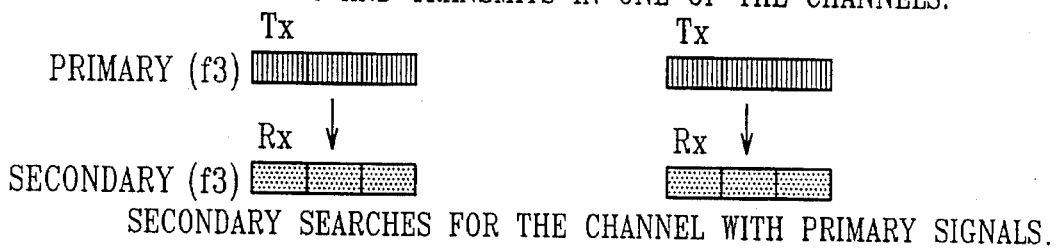

SECONDARY SEARCHES FOR THE CHANNEL WITH PRIMARY SIGNALS.

FIG. 4C

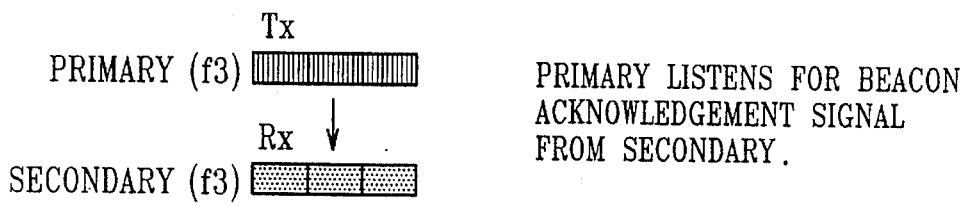

PRIMARY LISTENS FOR BEACON ACKNOWLEDGEMENT SIGNAL FROM SECONDARY.

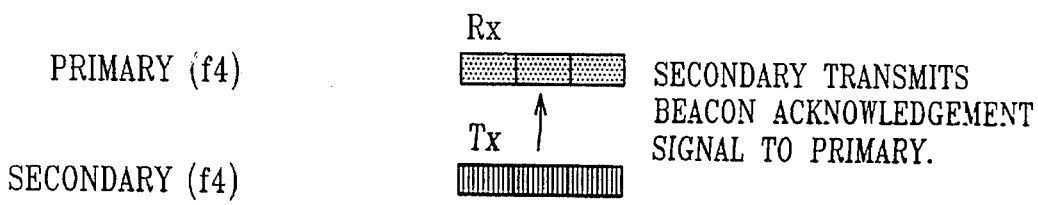

SECONDARY TRANSMITS BEACON ACKNOWLEDGEMENT SIGNAL TO PRIMARY.

FIG. 4D

PRIMARY BEGINS TO TRANSMIT DATA IN THE UNOCCUPIED CHANNEL.

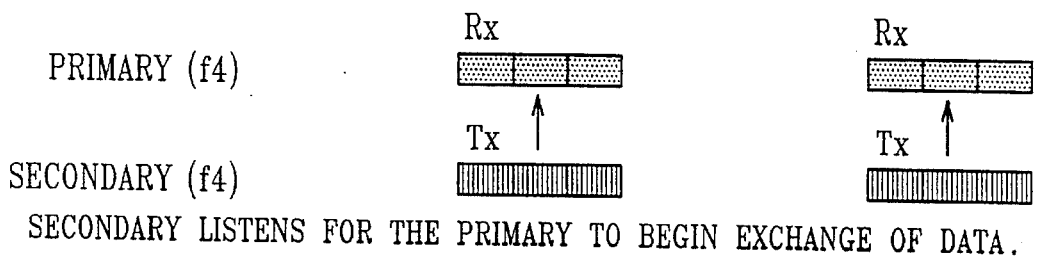

SECONDARY LISTENS FOR THE PRIMARY TO BEGIN EXCHANGE OF DATA.

BASE STATION DOWN-LINK FREQUENCY CHANNEL (f1)

Tx

PRIMARY SEARCHES FOR A PAIR OF UNOCCUPIED CHANNELS AND RECORDS THE UCIDS

PRIMARY TRANSMITS THE UCIDS TO SECONDARY

SECONDARY

BASE STATION UP-LINK FREQUENCY CHANNEL (f2)

Rx

SECONDARY ACKNOWLEDGES THE UCIDs TO PRIMARY

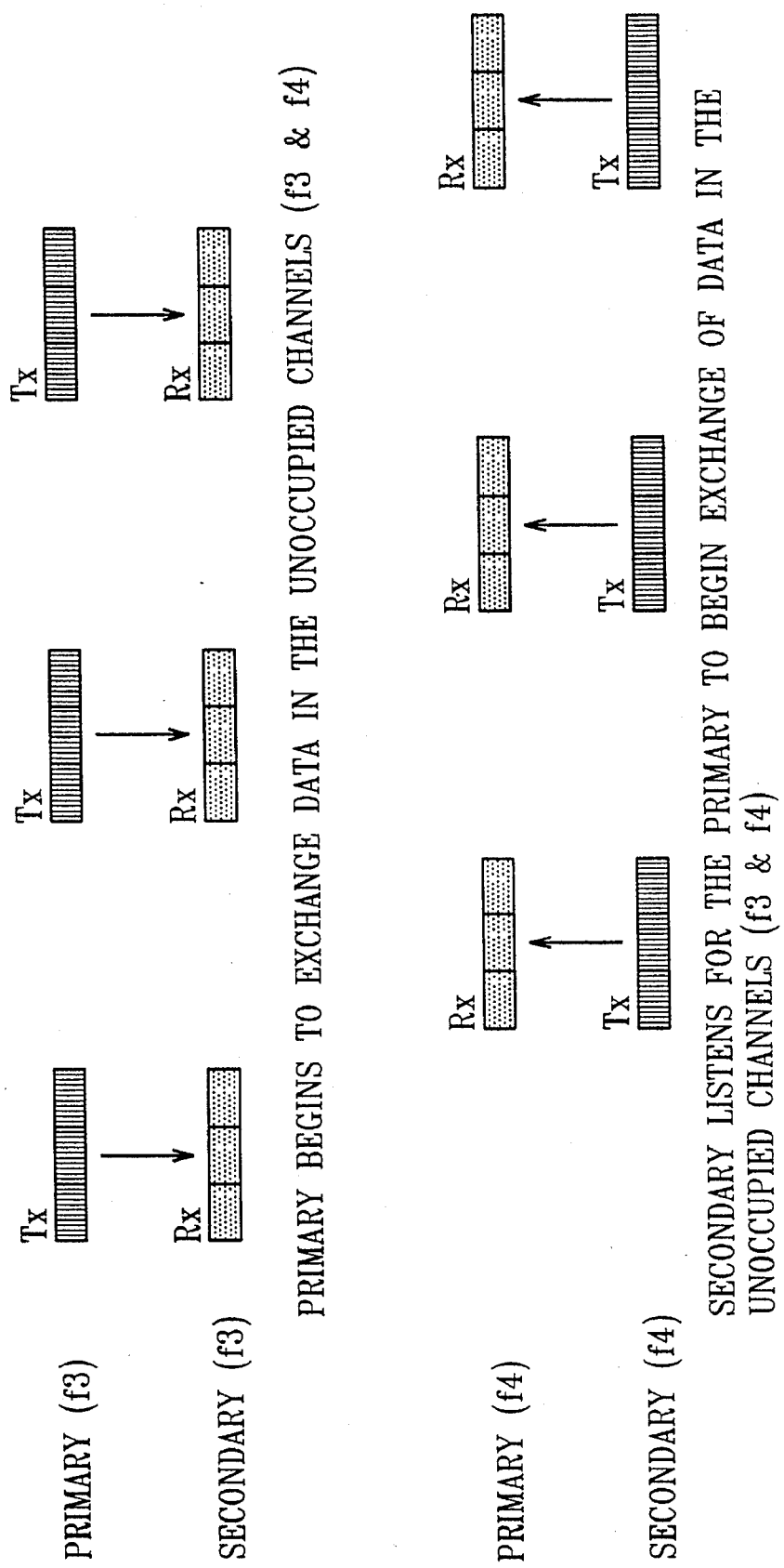

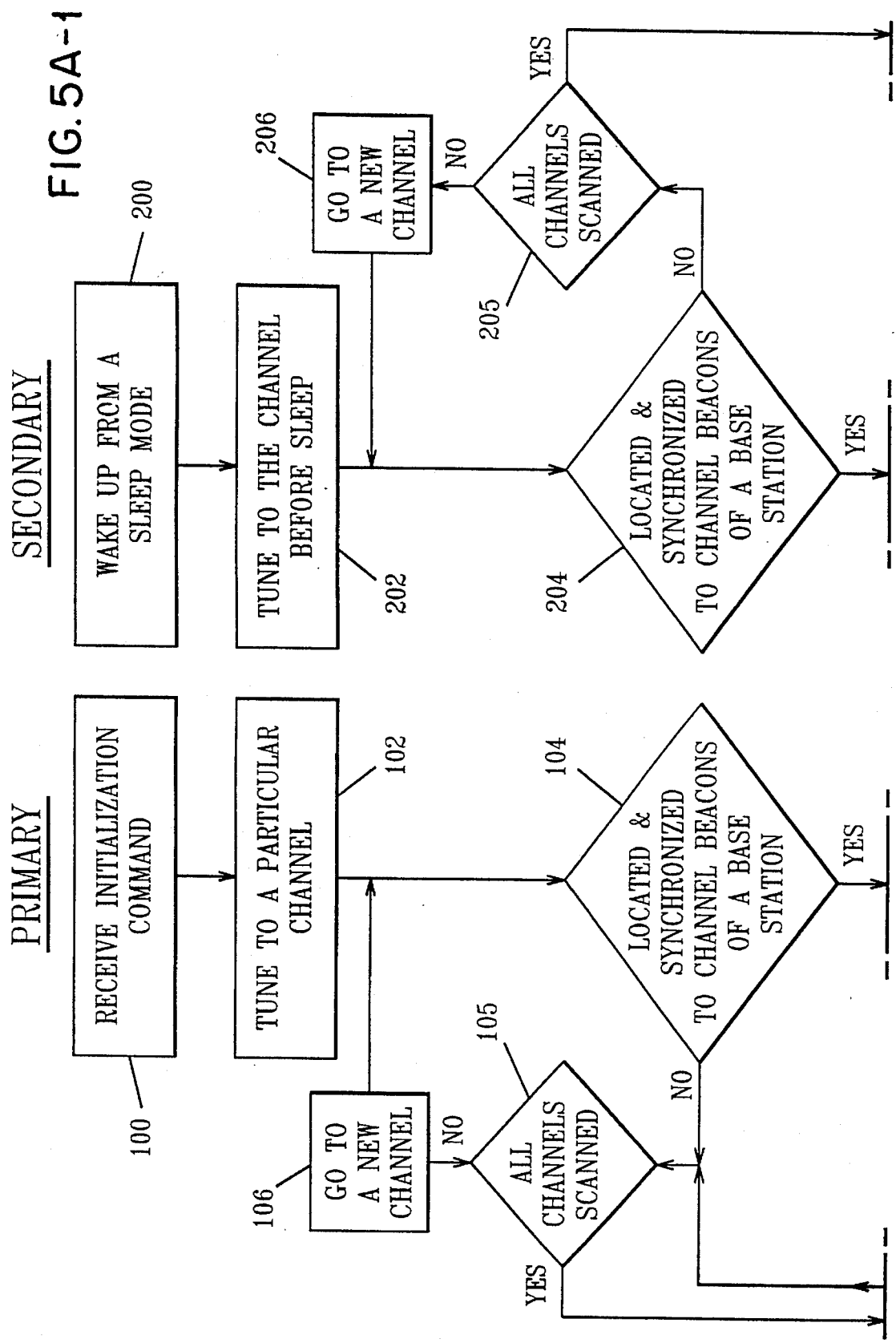

METHOD AND APPARATUS FOR DIRECT COMMUNICATION IN A TDMA RADIO COMMUNICATION SYSTEM

BACKGROUND OF THE INVENTION

1. Technical Field

The invention relates to time-division multiple-access (TDMA) radio communication systems, and, more particularly, to communication between portable units of a TDMA radio communication system.

2. Description of the Prior Art

Radio communication is an integral part of mobile voice and data communication networks. After a decade of research and development, technical standards are being translated into commercially viable products and networks, such as Second Generation Cordless Telephone (CT2), Digital European Cordless Telephone (DECT), and Group Special Mobile (GSM) as described in W. H. W. Tuttlebee, *Cordless Personal Communications*, IEEE Communications Magazine, December 1992, pp. 42–53.

Many radio communication networks utilize a TDMA scheme that allows a plurality of portable units to communicate with a single base station. The base stations typically provide an interface to an external communication network. Yet, there are drawbacks in the majority of today's TDMA systems. Most systems work in a base-to-portable mode in which a portable unit has to utilize a base station and its physical channels to communicate with another portable unit even though they are within direct reach of one other. The base-to-portable mode places an undue burden on the base station and renders the portable units useless without the base station. Some radio communication systems, such as wireless local-area networks (LANs), provide direct communication among portable units utilizing standard LAN techniques, but do not use the base station channel for initial communication setup.

Recently, the Japanese Personal Handy Phone System (PHS) has been developed. PHS allows portable units to perform direct communication when communication cannot be performed via a base station. Direct communication between an origination side portable unit and a destination side portable unit is established using unstable cyclic channel scanning. The origination side portable unit detects a free transmit and receive time slot in a communication channel and calls the destination side portable unit in the free transmit time slot. The destination side portable unit periodically scans all channels searching for the calling signal transmitted by the origination side portable unit. Upon detecting the calling signal, the destination side portable unit transmits an acknowledgement signal in the receive time slot. Communication then commences between the portable units during the transmit and receive time slots. Such a method is inefficient because the portable units consume large amount of power when routinely scanning all of the channels of the system for connection to an origination side portable unit.

As radio communication systems grow to include more portable units within direct reach of one another, it is likely that the demand for direct communication between such portable units will grow as well. For example, applications such as wireless file transfer between computers, remote terminal emulation, wireless business card exchange, and cordless phone systems will require direct communication between portable units. In these applications, radio communication systems must carry both voice and data efficiently between portable units.

Accordingly, it is an object of the present invention to provide a method for efficient communication of voice and data between portable units of a TDMA radio communication system.

It is a further object of the present invention to provide a method of direct communication between portable units that conserves power and time consumed by the portable units to establish the direct communication link.

Another object of the present invention is to provide a method of direct communication between portable units that does not impact the standard protocols for communicating between portable units and the base station.

Additional objects and advantages of the invention will become apparent in light of the description which follows, and in part will be obvious from the description, or may be learned by practice of the invention.

SUMMARY OF THE INVENTION

To achieve the objects in accordance with the purposes of the present invention, as embodied and described herein, a method for direct communication between portable units of a TDMA radio communication system includes the steps of: controlling a first user station to locate a base station channel; synchronizing the first user station with a first predetermined period of time within the base station channel during which the base station is not transmitting data and not receiving data; and controlling the first user station to transmit a first calling signal during the first predetermined period of time within the base station channel. Concurrently, a second user station is controlled to locate the base station channel; to synchronize with the first predetermined period of time and a second predetermined period of time within the base station channel during which the base station is not transmitting data and not receiving data; and to transmit a first acknowledgement signal during the second predetermined period of time within the base station channel upon receiving the first calling signal. After the first user station receives the first acknowledgement signal, subsequent communication between the first and second user stations occurs in a unoccupied channel. The base station channel may be a TDMA/TDD channel or a TDMA/FDD channel. For a TDMA/TDD communication system, it is preferred that the first predetermined period of time include the turn around time between transmitting and receiving of the base station, and the second predetermined period of time include the turn around time between receiving and transmitting of the base station.

To establish communication in an unoccupied channel, the first user station is controlled to locate an unoccupied channel and transmit a second calling signal during a third predetermined period of time within the unoccupied channel. Concurrently, the second user station is controlled to locate the unoccupied channel, to synchronize with the third predetermined period of time and a fourth predetermined period of time within the unoccupied channel, and to transmit a second acknowledgement signal during the fourth predetermined period of time within the unoccupied channel upon receiving the second calling signal. The first and second user stations exchange data within the unoccupied channel after the first user station receives the second acknowledgement signal. The unoccupied channel may be a TDMA/TDD channel or a TDMA/FDD channel.

Alternatively, to establish communication in an unoccupied channel, the first user station is controlled to locate an unoccupied channel and to transmit a channel identification signal identifying the unoccupied channel during the first predetermined period of time within the base station channel. Concurrently, the second user station is controlled to transmit a channel identification acknowledgement signal during the second predetermined period of time within the base station channel. The first and second user stations then exchange data in the unoccupied channel after the first user station receives the channel identification acknowledgement signal.

The apparatus corresponding to the first user station includes means for locating a base station channel; means for synchronizing with a first predetermined period of time within the base station channel during which the base station is not transmitting data and not receiving data; and means for transmitting a first calling signal during the first predetermined period of time within the base station channel.

The apparatus corresponding to the second user station includes means for locating the base station channel; means for synchronizing with the first predetermined period of time and a second predetermined period of time within the base station channel during which the base station is not transmitting data and not receiving data; and means for transmitting a first acknowledgement signal during the second predetermined period of time within the base station channel upon receiving the first calling signal during the first predetermined period of time.

BRIEF DESCRIPTION OF THE DRAWINGS

FIGS. 2A–C illustrates packet formats typically utilized in TDMA radio communication systems. FIG. 2A shows a MUX-1 packet used to exchange address data. FIG. 2B shows a MUX-2 packet used to exchange security data. And FIG. 2C shows a MUX-3 packet used to communicate voice and other forms of digital data.

FIGS. 3A–F illustrate TDMA Time Division Duplex (TDMA/TDD) signaling methods for establishing direct communication between portable units according to the present invention.

FIGS. 4A–F illustrate TDMA Frequency Division Duplex (TDMA/FDD) signaling methods for establishing direct communication between portable units according to the present invention.

DETAILED DESCRIPTION OF THE PREFERRED EMBODIMENTS

Figure 1:
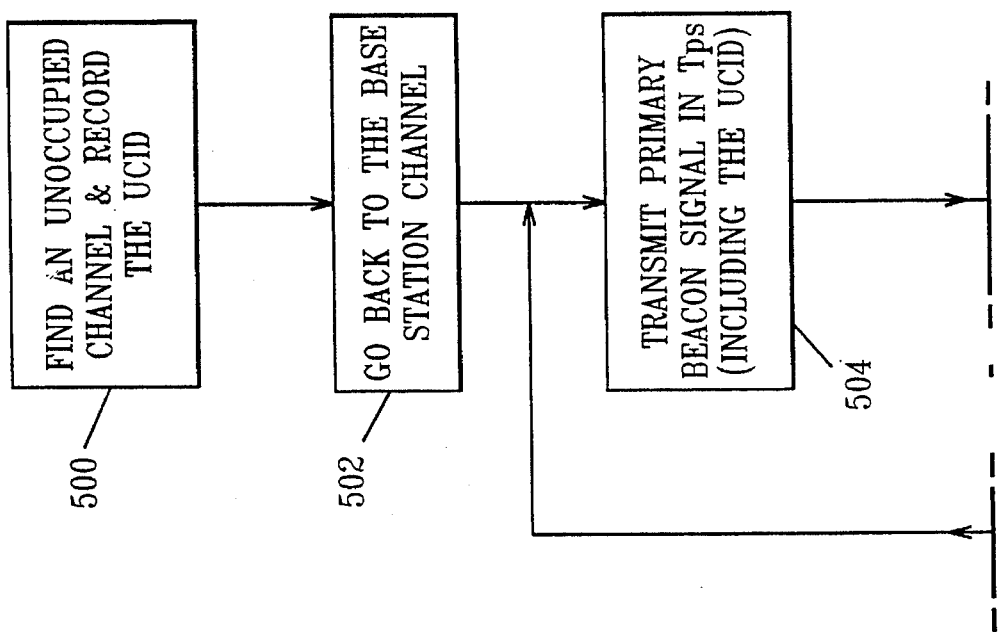
FIG. 1 depicts a cell of a TDMA radio communication system.
Figures 2, 5C:
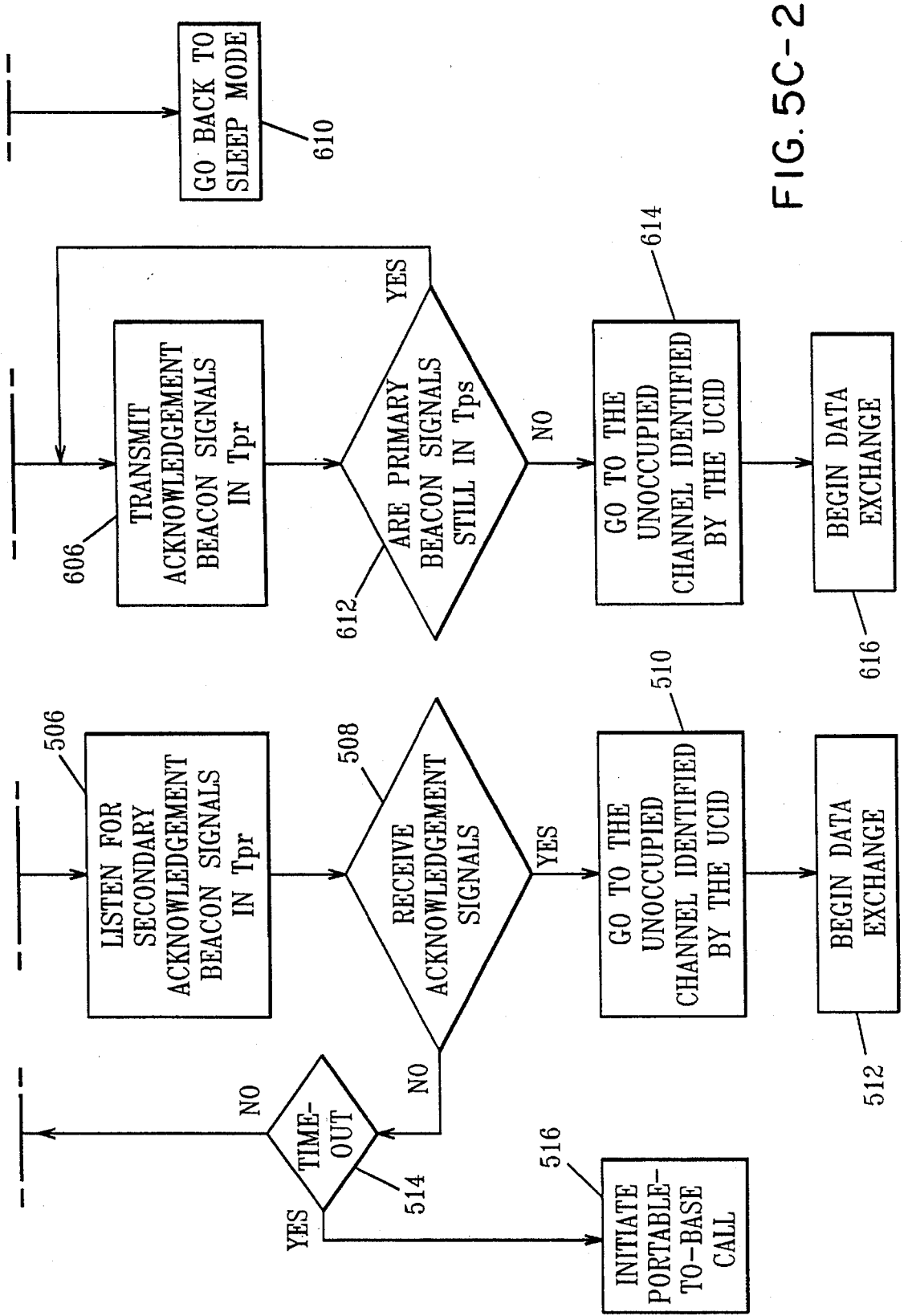

With reference to FIG. 1, a TDMA radio communication network typically includes a plurality of cells (a single cell is shown) each having at least one base station 2 and a plurality of portable units 4. The base station 2 interfaces to external networks 6, such as public switched telephone networks or local area networks, through a switching center 8. The base station 2 is connected to the switching center 8 via a communication link 10. The communication link 10 may include, for example, a cable such as a fiber optic cable or satellite link such as a microwave satellite link. The switching center 8 is connected to the external networks 6 via a communication link 12. The communication link 12 may include, for example, a cable such as a fiber optic cable or satellite link such as a microwave satellite link.

The base station 2 communicates with the portable units 4 over radio channels divided into a plurality of time slots. Each radio channel represents a predetermined frequency band. Each portable unit 4 is assigned a subset of the time slots for communication with the base station 2. There are two distinct schemes, out-of-band signaling and in-band signaling, for transferring data and control signals between the base station 2 and the portable units 4 over the time slots and corresponding channels of the TDMA radio communication system.

In the out-of-band signaling scheme, two channels are utilized to transfer data and control signals between the base station 2 and the portable units 4. One of the channels, the data channel, is used for data transfer. The other channel, the control channel, is used for signaling and control. The out-of-band signaling scheme is effective for voice communication in an allocated frequency band where the control channel is unlikely to be jammed by other users, but is inefficient in conserving power in data communication applications because the portable unit must constantly switch between the two channels (or include separate receiving/transmitting units for each channel, respectively). This is undesirable for portable applications in which battery life is extremely important.

In the in-band signaling scheme, both data and control signals are transmitted in the same channel. In-band signaling is particularly attractive in spread-spectrum frequency bands, in which a channel is likely to be jammed by other users. There are two distinct full duplex methods utilized in in-band signaling: time division duplex (TDD) and frequency division duplex (FDD).

As shown in FIG. 3A, a TDMA radio communication system employing TDD schemes (TDMA/TDD communication system) utilizes successive frames of data transmitted in a base station channel to communicate between the base station 2 and portable units 4. Each frame is defined by a predetermined duration of time and is divided into a plurality of time slots. The duration of the time slots is set according to the data rate and predetermined frame duration. Each portable unit 4 is assigned a subset of the time slots with the frame for communication with the base station 2. For example, a portable unit 4 may be assigned all of the time slots within each frame of the base station channel as shown in FIG. 3A.

The subset of time slots within the frame assigned to each portable unit 4 may be further divided into two categories: transmit time slots Tx wherein the base station 4 transmits data and the portable units 4 receive the transmitted data, and receive time slots Rx wherein the portable units 4 transmit data and the base station 2 receives the transmitted data. The base station channel of FIG. 3A, for example, shows frames divided into four transmit time slots Tx followed by four receive time slots Rx. Typically, the transmit time slots Tx include a time slot S used for synchronization and the exchange of identification and control data from the base station 2 to the portable units 4, and the receive time slots Rx include a time slot R used for synchronization and the exchange of identification and control data from the portable units 4 to the base station 2. The time slots S and R may not occur every frame.

TDMA/TDD communication systems using in-band signaling for data communications advantageously conserve power because the portable units do not have to switch between channels due to the fact that the exchange of data and control signals between the base station and portable units occurs within the same channel, i.e. the base station channel.

Figure 4A:
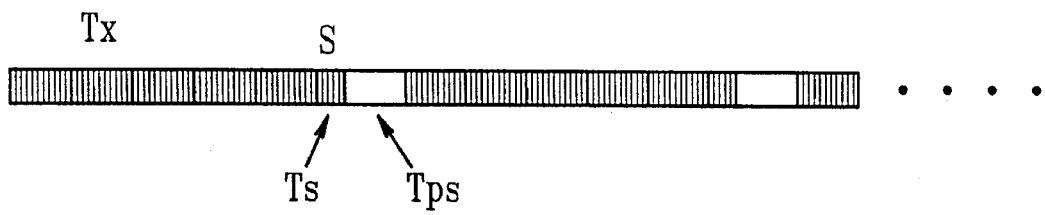
Figure 4A:
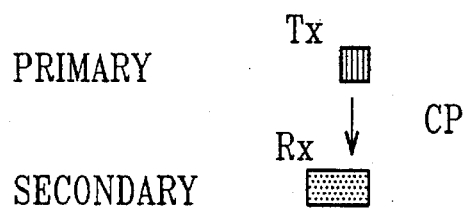
Figure 4A:
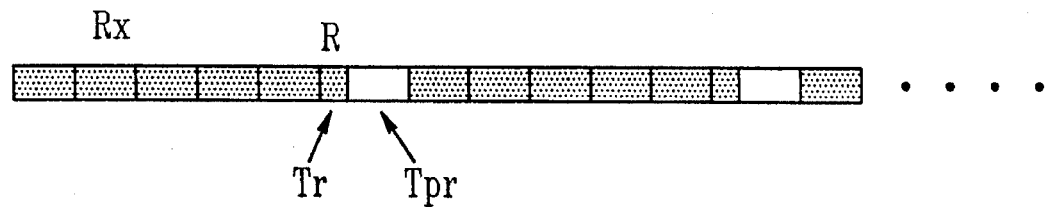
Figure 4A:

In contrast, as shown in FIG. 4A, a TDMA radio communication system employing FDD schemes (TDMA/FDD communication system) utilizes successive frames of data transmitted within two separate channels to communicate between the base station 2 and portable units 4. One channel, the down-link channel, is used to transfer data and control signals from the base station 2 to the portable units 4. The other channel, the up-link channel, is used to transfer data and control signals from the portable units 4 to the base station 2. Each frame is defined by a predetermined duration of time and is divided into a plurality of time slots. The duration of the time slots is set according to the data rate and predetermined frame duration. Each portable unit 4 is assigned a subset of the time slots with the frame for communication with the base station 2. For example, a portable unit 4 may be assigned all of the time slots within each frame as shown in FIG. 4A.

The subset of time slots within the frame assigned to each portable unit 4 is further divided into two categories: transmit time slots Tx wherein the base station 2 transmits data within the down-link channel and the portable unit 4 receives the transmitted data within the down-link channel, and receive time slots Rx wherein the portable units 4 transmit data within the up-link channel and the base station 2 receives the transmitted data in the up-link channel. For example, FIG. 4A shows frames divided into six transmit time slots Tx in the down-link channel and six receive time slots Rx in the up-link channel. Typically, the transmit time slots Tx include a time slot S used for synchronization and the exchange of identification and control data from the base station 2 to the portable units 4, and the receive time slots Rx include a time slot R used for synchronization and the exchange of identification and control data from the portable units 4 to the base station 2. The time slots S and R may not occur in every frame.

In both the TDD and FDD TDMA communication systems, data is communicated in time slots using packets. The packets are usually of equal length, but are not limited in this respect. The format of the packets typically vary according to different multiplexing modes. As shown in FIG. 2A, for link set-up or MUX-1 mode, the packet format may include, for example, a preamble field and a synchronization field for frame alignment, an address field for communicating identification data, a control field for signaling, and an error-control field for error detection and correction. As shown in FIG. 2B, for security exchange mode or MUX-2 mode wherein security encryption and/or decryption data is exchanged, the packet format may include, for example, a preamble field and a synchronization field for frame alignment, an address field for communicating identification data, a key field for communicating encryption and/or decryption key data, a control field for signaling, and an error-control field for error detection and correction. And as shown in FIG. 2C, for normal communication mode or MUX-3 mode, the packet format may include, for example, a preamble field and a synchronization field for frame alignment, a data field, a control field for signaling, and an error-control field for error detection and correction.

According to the present invention, in a TDMA/TDD communication system, direct communication between a primary portable unit initiating the communication and a secondary portable unit is established utilizing two handshaking operations. The first handshaking operation is performed in the base station channel to establish initial contact between the primary and secondary portable units. After initial contact is made, the second handshaking operation is performed to establish communication in an unoccupied channel.

Figures 2, 5A:
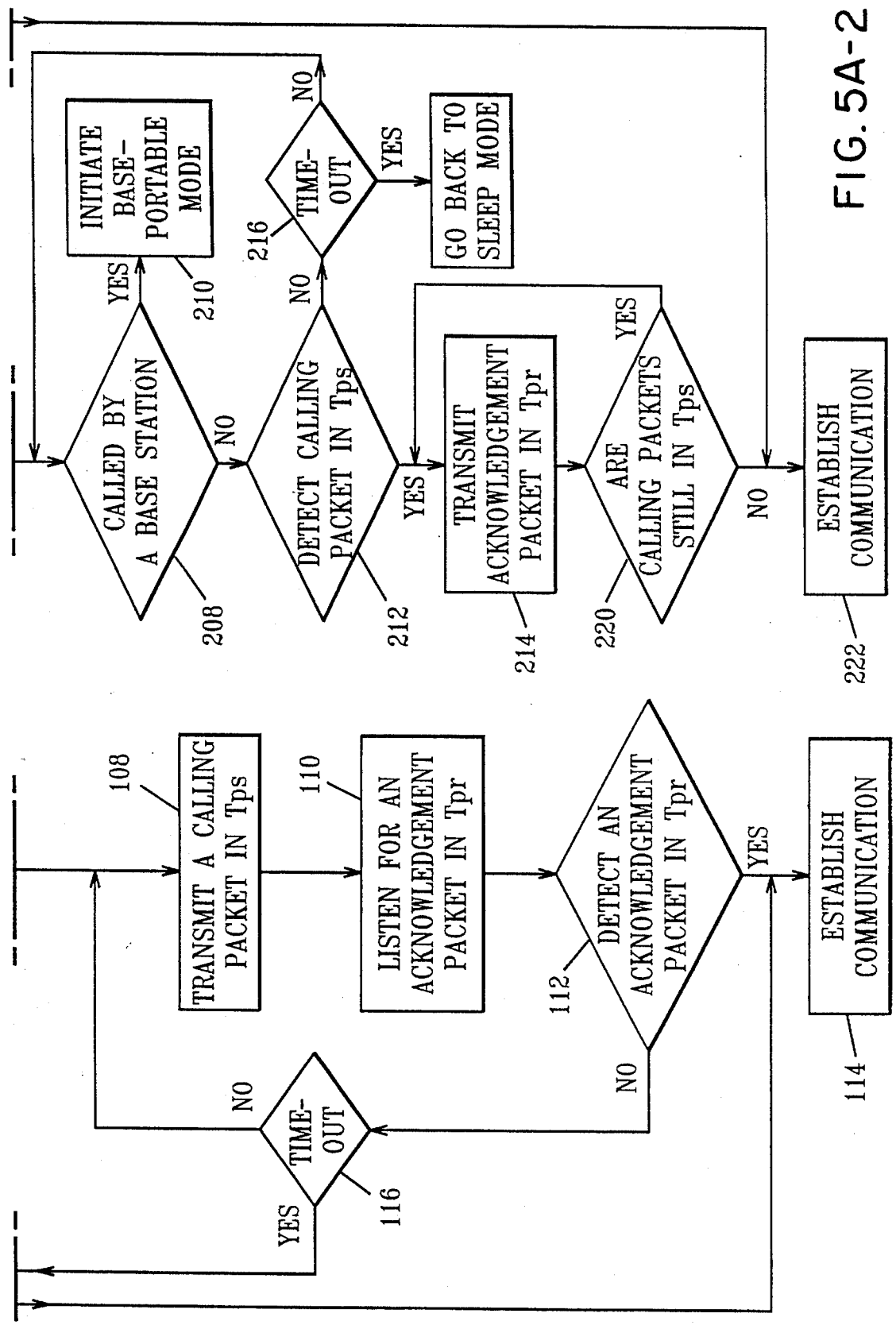
FIGS. 5A–C are flow charts illustrating the in-band signaling methods of FIGS. 3A–F and 4A–F.
Figure 5B:
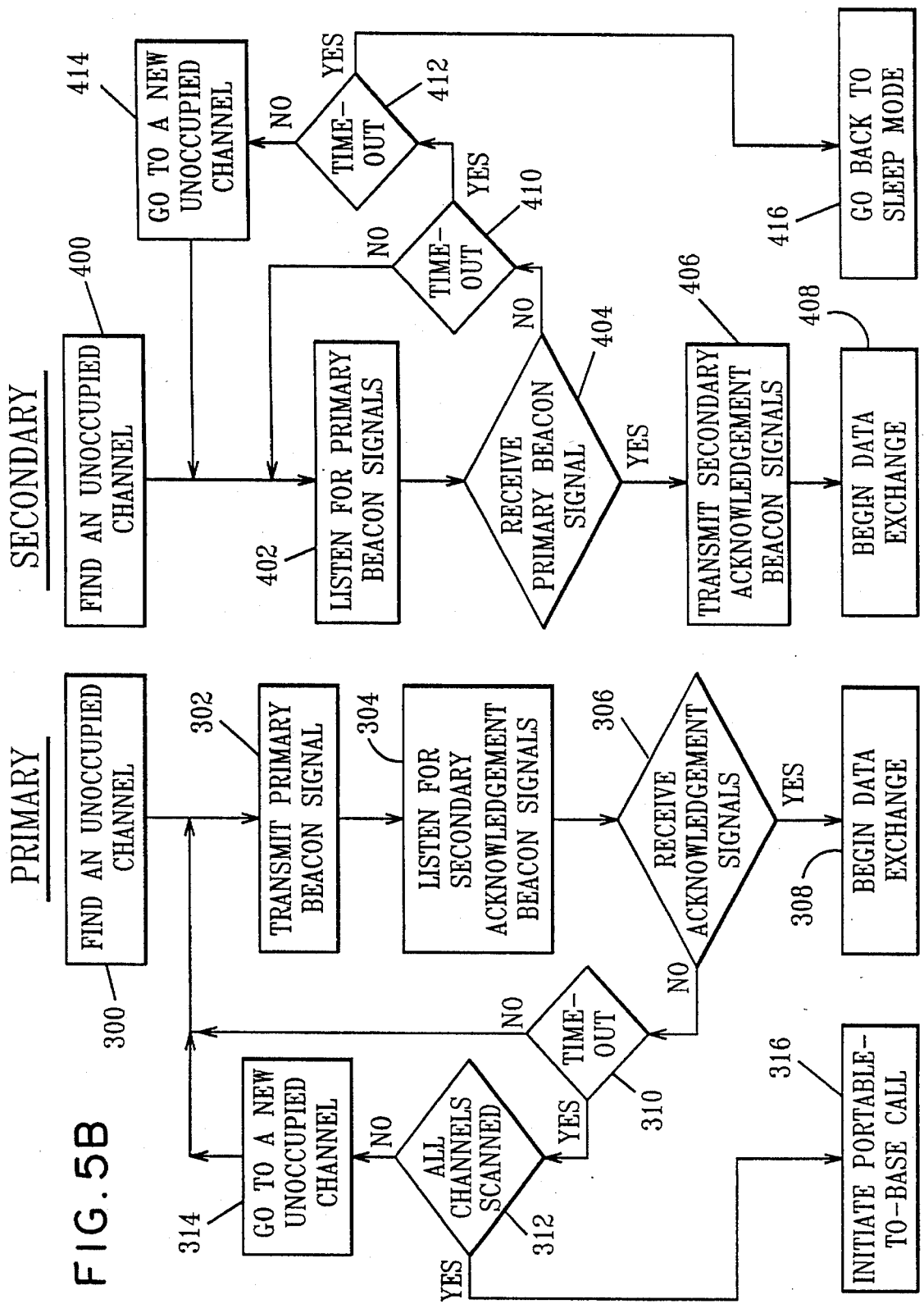

FIGS. 3A–F and 5A–C illustrate a method of establishing direct communication between portable units of a TDMA/TDD communication system according to the present invention. In particular, FIGS. 3A and 5A illustrate the first handshaking operation. With reference to FIG. 5A, in step 100, the primary portable unit receives a command to initiate communication with the secondary portable unit. The command may be input by a user, for example, in the case of direct voice communication between the primary and secondary portable units. The command may also be generated automatically, for example, in the case of automatic file backup between a computer coupled to the primary portable unit and a computer coupled to the secondary portable unit.

In steps 102–106, the primary portable unit scans channels until it has located and is synchronized with a base station channel. Data identifying the channels to be scanned may be stored in a memory of the primary portable unit. The data may be permanently stored in the memory or downloaded from the base station. In step 102, the primary portable unit tunes to a particular channel, and then in step 104 attempts to locate and synchronize to base station beacon signals within the particular channel. If step 104 fails, the primary portable unit goes to step 105 to check whether all channels have been scanned. In step 105, if it is determined that all channels have not been scanned, the primary portable unit goes to another channel in step 106 and then returns to step 104. If step 104 is successful, flow continues to step 108. Location and synchronization with base station channel beacons within the particular channel may be accomplished by the base station transmitting a MUX-1 packet during the S time slot and the primary portable unit listening for and detecting the MUX-1 packet in the particular channel. Once synchronized with the base station channel beacons, timing circuitry of the primary portable unit can identify predetermined time periods within the base station channel, such as the turn-around time Tps, which is the time period between the base station's transmitting mode and receiving mode, and the turn-around time Tpr, which is the time period between the base stations's receiving mode and transmitting mode, as shown in FIG. 3A.

In step 108, the primary portable unit transmits in the base station channel a calling packet CP during a first predetermined period of time, preferably the turn-around time Tps, and then in step 110 listens for an acknowledgement packet AP transmitted by the secondary portable unit in the base station channel during a second predetermined period of time, preferably the turn-around time Tpr. The calling packet CP and the acknowledgment packet AP may have, for example, the MUX-1 packet structure as shown in FIG. 2A.

Concurrent with the operation of the primary portable unit as described above, if the secondary portable unit is not currently in communication with the base station, i.e. is in sleep-mode, the secondary portable unit periodically wakes up and synchronizes to a base station channel. In step 200, the secondary portable unit wakes up from sleep mode and then in step 202 tunes to a particular channel, which may be a base station channel that the secondary unit was tuned to prior to entering the sleep mode. In step 204, the secondary portable unit attempts to locate and synchronize to base station beacon signals within the particular channel. Location and synchronization with base station channel beacons within the particular channel may be accomplished by the base station transmitting a MUX-1 packet during the S time slot and the secondary portable unit listening for and detecting the MUX-1 packet in the particular channel. Once synchronized with the base station channel beacons, timing circuitry of the secondary portable unit can identify predetermined time periods within the base station channel, such as the turn-around times Tps and Tpr.

If step 204 fails, the secondary portable unit goes to step 205 to check whether all channels have been scanned. Data identifying the channels to be scanned may be stored in a memory of the secondary portable unit. The data may be permanently stored in the memory or downloaded from the base station. If in step 205, it is determined that all channels have not been scanned, in step 206 the secondary portable unit goes to another channel and then returns to step 204. If step 204 is successful, the secondary portable unit determines if it is being called by the base station in step 208. This may be accomplished by the base station transmitting a MUX-1 packet requesting link setup with the secondary portable unit during the S time slot within the base station channel and the secondary portable unit listening for and detecting the MUX-1 packet in the base station channel. If in step 208, the secondary portable unit determines that it is being called by the base station, the secondary portable unit initiates base-to-portable mode operation in step 210. Base-to-portable mode operation is well known in the art as illustrated in Digital European Cordless Telephone (DECT) Common Interface, European Telecommunications Standards Institute, 1992, hereinafter incorporated by reference. If in step 208, the secondary portable unit determines that it is not being called by the base station, flow continues to step 212.

In step 212, the secondary portable unit listens for the calling packet CP transmitted by the primary portable unit in the turn around time Tps as shown in FIG. 3A. If in step 212, the secondary portable unit detects the calling packet CP, in step 214 the secondary portable unit transmits an acknowledgement packet AP in the turn-around time Tpr. If in step 212, the secondary portable unit fails to detect the calling packet CP, flow continues to step 216 wherein the secondary portable unit determines whether a timeout period has expired. If in step 216, the secondary portable unit determines that the timeout period has not expired, flow returns back to step 208. If in step 216, the secondary portable unit determines that the timeout period has expired, in step 218 the periodic wake-up operation ends and the secondary portable unit may go back to sleep mode.

As described above, in step 108 the primary portable unit transmits the calling packet CP and in step 110 listens for the acknowledgement packet AP transmitted by the secondary portable unit. Flow then continues to step 112 wherein the primary portable unit checks for detection of the acknowledgement packet AP transmitted by the secondary portable unit in step 214. If the detection of the acknowledgement packet AP is successful in step 112, the operation of the primary portable unit continues to step 114 wherein the primary and secondary portable units perform the second handshaking operation to establish communication in an unoccupied channel.

However, transmission of the acknowledgement packet AP by the secondary portable unit may not be forthcoming because, for example, the secondary portable unit may have been in a different frequency channel or in sleep mode as shown in FIG. 3A. To take this scenario into account, in step 112 if the primary portable unit fails to detect the acknowledgement packet AP, the primary portable unit checks if a timeout period has expired in step 116. If in step 116 the time-out period has not expired, flow continues back to steps 108 and 110 wherein the primary portable unit retransmits the calling packet CP and subsequently listens for the acknowledgement packet AP.

The secondary portable unit, on the other hand, retransmits the acknowledgement packet AP if it does not receive confirmation from the primary portable unit that the acknowledgement packet AP has been received. Confirmation that the primary portable unit has received the acknowledgement packet can be accomplished in many ways. For example, in step 220, the secondary portable unit checks for several calling packets CP in the turn-around time Tps. If in step 220 the secondary portable unit detects several calling packets CP in the turn-around time Tps, flow returns back to step 214 to retransmit the acknowledgement packet AP. If in step 220 the secondary portable unit fails to detect the calling packets CP in the turn-around time Tps, it is confirmed that the primary portable unit has received the acknowledgement packet AP and the operation of the secondary portable unit continues to step 222 wherein the primary and secondary portable units perform the second handshaking operation to establish communication in an unoccupied channel.

In step 116, if the time-out period has expired, flow continues back to step 105 wherein the primary portable unit determines if all channels have been scanned. In step 105, if the primary portable unit determines that all of the channels have been scanned, the first handshaking operation ends. However, flow continues to step 114 to attempt to utilize the second handshaking operation to establish the communication link between the primary and secondary portable units. Similarly, in step 205, if the secondary portable unit determines that all channels have been scanned, flow continues to step 222 to attempt to utilize the second handshaking operation.

FIGS. 3B–D and FIG. 5B illustrate the second handshaking operation between the primary and secondary portable units of a TDMA/TDD communication system according to a first embodiment of the present invention. In step 300, the primary portable unit scans channels to find an unoccupied channel. Data identifying the channels to be scanned may be stored in memory of the primary portable unit. The data may be permanently stored in the memory or downloaded from the base station. In step 302, the primary portable unit transmits primary beacon signals PBS during transmit time slots in the unoccupied channel, and in step 304 listens for secondary beacon acknowledgement signals BAS during receive time slots as shown in FIG. 3B. The primary beacon signals PBS and secondary beacon acknowledgement signals BAS may have the MUX-1 format as shown in FIG. 2A.

Concurrently, the secondary portable unit scans channels listening for primary beacon signals PBS. Data identifying the channels to be scanned may be stored in a memory of the secondary portable unit. The data may be permanently stored in the memory or downloaded from the base station. In step 400, the secondary portable unit tunes to an unoccupied channel, and in step 402 listens for primary beacons signals PBS. In step 404, the secondary portable unit determines if it has located and is synchronization with primary beacon signals PBS transmitted by the primary portable unit. Once synchronized with the primary beacon signals PBS, timing circuitry of the secondary portable unit identifies the transmit and receive time slots. If in step 404, the secondary portable unit determines that it has located and is synchronization with primary beacon signals PBS, the secondary portable unit in step 406 transmits secondary beacon acknowledgement signals BAS during receive time slots in the particular channel as shown in FIG. 3B and listens for the primary portable unit to begin the exchange of data in step 408. If in step 404, the secondary portable unit determines it has not located or is not synchronized with primary beacon signals PBS, the secondary portable unit in step 410 checks if a first timeout period has expired. If in step 410 the first timeout period has not expired, flow returns back to step 402 wherein the secondary portable unit listens for primary beacon signals PBS in the particular channel. If in step 410 the first timeout period has expired, the secondary portable unit in step 412 determines if a second timeout period has expired. If in step 412, the second timeout period has not expired, the secondary portable unit tunes to a new unoccupied channel in step 414 and returns back to step 402 to listen for primary beacon signals PBS in the new channel. If in step 412, the second timeout period has expired, the second handshaking operation ends and the secondary portable unit returns back to sleep mode in step 416.

Concurrently, the primary portable unit in step 306 determines whether it has received secondary beacon acknowledgement signals BAS during receive time slots. If in step 306 the reception of the secondary beacon acknowledgement signals BAS has been successful, flow continues to step 308 wherein the primary and secondary portable units begin data exchange as shown in FIG. 3D. If in step 306, the primary portable unit determines that the secondary beacon acknowledgement signals BAS have not been received, the primary portable unit in step 310 checks if a timeout period has expired. If in step 310 the timeout period has not expired, flow returns back to steps 302 and 304 wherein the primary portable unit retransmits primary beacon signals PBS and listens for secondary beacon acknowledgement signals BAS. If in step 310 the timeout period has expired, the primary portable unit checks whether all channels have been scanned in step 312. If in step 312, all the channels have not been scanned, the primary portable unit goes to a new unoccupied channel in step 314 and flow returns back to steps 302 and 304 wherein the primary portable unit transmits primary beacon signals PBS during transmit time slots in the new channel and listens for secondary beacon acknowledgement signals BAS during receive time slots in the new channel. If in step 312, all the channels have been scanned, the second handshaking operation ends in step 316. In this scenario, it is probable that the secondary portable unit is in base-to-portable mode or is out of direct radio reach of the primary portable unit. In step 316, the primary portable unit may intiate a portable-to-base call to attempt to reach the secondary portable unit via the base station 4.

The data exchange of steps 308 and 408, as shown in FIG. 3D, may include the communication of security data, for example, an encryption key and/or a decryption key, in a MUX-2 format and/or the communication of voice or other types of digital data in a MUX-3 format.

According to a second embodiment of the present invention, the functions of the primary and secondary portable units of the TDMA/TDD communication system in the second handshaking operation as described-above with respect to the first embodiment may be reversed. In this case, the secondary portable unit scans channels to find an unoccupied channel, transmits secondary beacon signals in the unoccupied channel, and listens for primary beacon acknowledgement signals. Concurrently, the primary portable unit scans channels listening for the secondary beacon signals transmitted by the secondary portable unit, and transmits primary beacon acknowledgement signals upon receiving the secondary beacon signals.

Figure 5C:
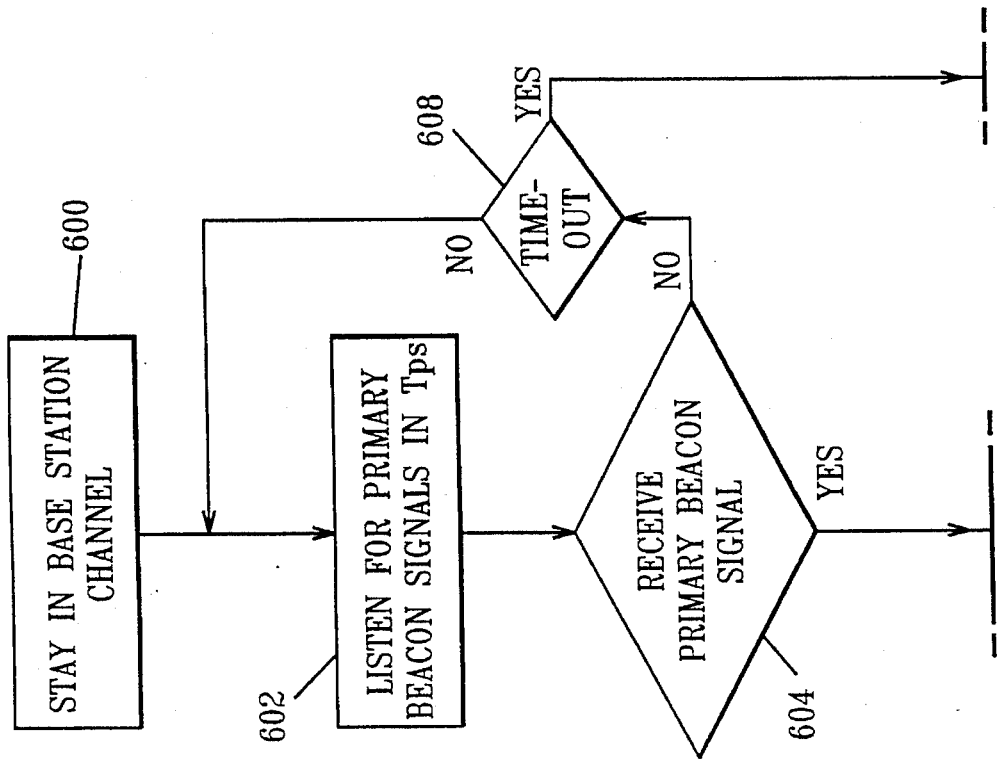

FIGS. 3E–F and FIG. 5C illustrate the second handshaking operation of the primary and secondary portable units of a TDMA/TDD system according to a third embodiment of the present invention. In step 500, the primary portable unit scans channels until it finds an unoccupied channel, and records an unoccupied channel identifier (UCID) that identifies the unoccupied channel. Data identifying the channels to be scanned may be stored in memory of the primary portable unit. The data may be permanently stored in the memory or downloaded from the base station. In step 502, the primary portable unit goes back to the base station channel and in step 504 transmits a primary beacon signal during the turn-around time Tps in the base-station channel, and in step 506 listens for a secondary acknowledgement beacon signal during the turn-around time Tpr as shown in FIG. 3E. The primary beacon signal includes the unoccupied channel identifier UCID. The secondary acknowledgement beacon signal identifies that the secondary portable unit has successfully received the unoccupied channel identifier UCID transmitted by the primary portable unit. The primary beacon signal and the secondary acknowledgement beacon signal may have the MUX-1 format as shown in FIG. 2A.

Concurrently, the secondary portable unit in step 600 stays in the base station channel and in step 602 listens for the primary beacon signal during the turn-around time Tps in the base station channel. In step 604, the secondary portable unit determines if it has received the primary beacon signal during the turn-around time Tps in the base station channel. If in step 604, the secondary portable unit has received the primary beacon signal, the secondary portable unit in step 606 transmits the secondary acknowledgement beacon signal during the turn-around time Tpr in the base station channel as shown in FIG. 3E. If in step 604, the secondary portable unit has not received the primary beacon signal, the secondary portable unit in step 608 checks if a timeout period has expired. If in step 608 the timeout period has not expired, flow returns back to step 602 wherein the secondary portable unit listens for the primary beacon signal during the turn-around time Tps in the base station channel. If in step 608 the timeout period has expired, the operation ends unsuccessfully in step 610 and the secondary portable unit may go back to sleep mode.

As described above, in step 504 the primary portable unit transmits the primary beacon signal and in step 506 listens for the secondary acknowledgement beacon signal. Flow then continues to step 508 wherein the primary portable unit checks for detection of the secondary acknowledgment beacon signal. If the detection of the secondary acknowledgement beacon signal is successful in step 508, the primary portable unit goes to the unoccupied channel identified by the unoccupied channel identifier (UCID) in step 510 and begins data exchange in step 512 as shown in FIG. 3F.

However, transmission of the secondary acknowledgement beacon signal by the secondary portable unit may not be forthcoming because, for example, the base station channel is jammed by communication between other user stations, and thus the secondary portable unit never received the primary beacon signal. To take this scenario into account, if in step 508 the primary portable unit determines that the secondary acknowledgement beacon signal has not been received, the primary portable unit in step 514 checks if a timeout period has expired. If in step 514 the timeout period has not expired, flow returns back to steps 504 and 506 wherein the primary portable unit retransmits the primary beacon signal and listens for the secondary acknowledgement beacon signal. If in step 514 the timeout period has expired, the operation ends in step 516 wherein the primary portable unit may intiate a portable-to-base call to attempt to communicate with the secondary portable unit via the base station 4.

In steps 606 and 612, the secondary portable unit retransmits the secondary acknowledgement beacon signal if it does not receive confirmation from the primary portable unit that the secondary acknowledgement beacon signal has been received. Confirmation that the primary portable unit has received the secondary acknowledgement beacon signal can be accomplished in many ways. For example, in step 612, the secondary portable unit checks for several primary beacon signals in the turn-around time Tps. If in step 612 the secondary portable units detects several primary beacon signals in the turn-around time Tps, flow returns back to step 606 to retransmit the secondary acknowledgement beacon signal. If in step 612 the secondary portable units fails to detect the primary beacon signals, it is confirmed that the primary portable unit has received the secondary acknowledgement beacon signal and the operation of the secondary portable unit continues to step 614 wherein the secondary portable unit goes to the unoccupied channel identified by the unoccupied channel identifier (UCID) and begins the exchange of data in step 616.

According to a fourth embodiment of the present invention, the functions of the primary and secondary portable units of the TDMA/TDD communication system in the second handshaking operation as described-above in the third embodiment may be reversed. In this case, the secondary portable unit scans channels to find an unoccupied channel, transmits a secondary beacon signal during the turn-around time Tpr in the base station channel and then listens for a primary acknowledgement beacon signal during the turn-around time Tps in the base station channel. The secondary beacon signal includes a unoccupied channel identifier that identifies the unoccupied channel. Concurrently, the primary portable unit listens for the secondary beacon signal transmitted by the secondary portable unit, and transmits the primary acknowledgement beacon signal upon receiving the secondary beacon signal.

The embodiments described above advantageously limit the power and time utilized by the primary and secondary portable units of TDMA/TDD communication system in establishing direct communication by employing the turn-around times, Tps and Tpr, in the base station channel to perform the first handshaking operation and, in the case of the third and fourth embodiments, to perform the second handshaking operation. Moreover, the standard protocols for communication between the base station and the portable units remain unaffected. And importantly, the physical radio channels of the base station remain unaffected, thereby conserving capacity of the base station that may be utilized for communication between the base station and other portable units.

However, if the turn-around times, Tps and Tpr, are of short duration, the base station may be controlled to be turned off for predetermined periods of time during one or more of the plurality of successive frames of the base station channel. Preferably, for fast access time the base station may be controlled to turned off for predetermined periods of time in each frame (typically less than a few percent of the frame duration). The predetermined periods of time are reserved for establishing direct communication between portable units. In this case, it is preferred that the predetermined periods of time include the turn-around times, Tpr and Tps, respectively.

The present invention is also applicable to TDMA/FDD communication systems. In this case, the first handshaking operation is performed in the down-link and up-link channels to establish initial contact between the primary and secondary portable units. After initial contact is made, the second handshaking operation is performed to establish communication in a pair of unoccupied channels.

FIGS. 4A–F and 5A–C illustrate a method of establishing direct communication between portable units of a TDMA/FDD communication system according to the present invention. In particular, FIGS. 4A and 5A illustrate the first handshaking operation. The operation is similar to the first handshaking operation as described above with respect to the TDMA/TDD communication system, however communication between the base station and the portable units occurs over two separate frequency channels: the down-link channel and the up-link channel.

As shown in FIG. 4A, the primary portable unit transmits a calling packet CP during a first predetermined period of time, Tps, in the down-link channel and listens for an acknowledgement packet AP transmitted by the secondary portable unit during a second predetermined period of time, Tpr, in the up-link channel. The base station is controlled to be turned off during the first and second predetermined periods of time, Tps and Tpr, within the down-link and up-link channels. Preferably, the first and second periods of time, Tps and Tpr, are adjacent to the control slots S and R, respectively.

The secondary portable unit, on the other hand, scans channels listening for the calling packet CP transmitted by the primary portable unit in the first predetermined period of time within the down-link channel. Upon detecting the calling packet CP, the secondary portable unit transmits the acknowledgement packet AP in the second predetermined period of time within the up-link channel. When the primary portable unit receives the acknowledgement packet AP, the operation of the primary portable unit continues to the second handshaking operation. When the secondary portable unit receives confirmation that the acknowledgement packet AP has been received by the primary portable unit, for example, by detecting that the primary portable unit has terminated transmission of calling packet CP, the operation of the secondary portable unit continues to the second handshaking operation.

FIGS. 4B–D and FIG. 5B illustrate the second handshaking operation of the primary and secondary portable units of a TDMA/FDD system according to a fifth embodiment of the present invention. This operation is similar to the second handshaking operation of a TDMA/TDD communication system described above with respect to the first embodiment. In this case, the primary portable unit scans channels to find a pair of unoccupied channels: a first unoccupied channel and a second unoccupied channel. The primary portable unit then transmits primary beacon signals in the first unoccupied channel and listens for secondary acknowledgement beacon signals in the second unoccupied channel. The primary beacon signals may include data that identifies the second unoccupied channel. Concurrently, the secondary portable unit scans channels listening for primary beacon signals transmitted by the primary portable unit, and transmits secondary acknowledgement beacon signals in the second unoccupied channel upon receiving the primary beacon signals. When the primary portable unit receives the secondary acknowledgement beacon signals, the primary portable unit then begins the exchange of data with the secondary portable unit in the first and second unoccupied channels as shown in FIG. 4D. When the secondary portable unit receives confirmation that the secondary acknowledgement beacon signals have been received by the primary portable unit, for example, by detecting that the primary portable unit has terminated transmission of the primary beacon signals, the operation of the secondary portable unit continues to begin the exchange of data in the first and second unoccupied channels as shown in FIG. 4D.

According to a sixth embodiment of the present invention, the functions of the primary and secondary portable units of the TDMA/FDD communication system in the second handshaking operation as described-above with respect to the fifth embodiment may be reversed. In this case, the secondary portable unit scans channels to find a pair of unoccupied channels: a first unoccupied channel and a second unoccupied channel. The secondary portable unit then transmits secondary beacon signals in the first unoccupied channel and listens for primary acknowledgement beacon signals in the second unoccupied channel. The secondary beacon signals may include data that identifies the second unoccupied channel. Concurrently, the primary portable unit scans channels listening for the secondary beacon signals, and transmits primary acknowledgement beacon signals within the second unoccupied channel upon receiving the secondary beacon signals.

Figure 4E:
Figure 4E:
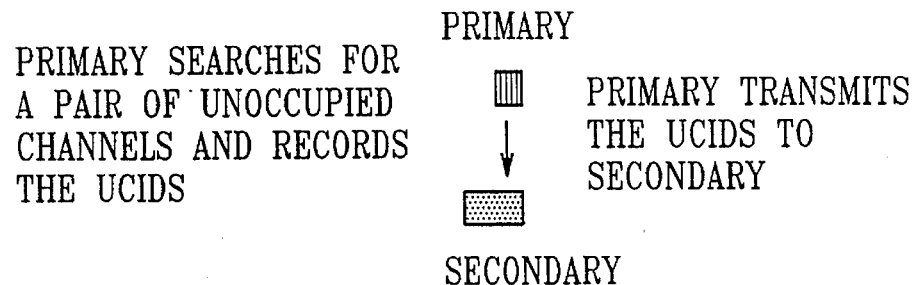
Figure 4E:
Figure 4E:
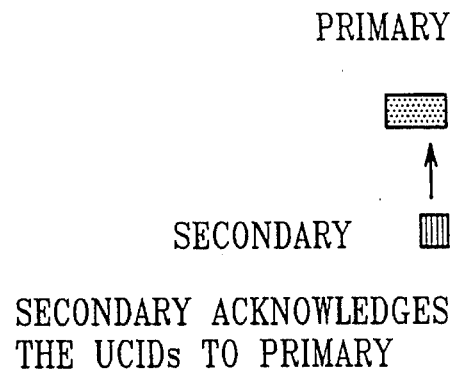

FIGS. 4E–F and 5C illustrate the second handshaking operation of the primary and secondary portable units of a FDD/TDMA system according to a seventh embodiment of the present invention. This operation is similar to the second handshaking operation of a TDMA/TDD communication system described above with respect to the third embodiment. In this case, the primary portable unit scans channels until it finds a pair of unoccupied channels, and records an unoccupied channel identifier (UCID) that identifies the unoccupied channels. As shown in FIG. 4E, the primary portable unit then transmits a primary beacon signal that includes the unoccupied channel identifier (UCID) during the first predetermined period of time in the down-link channel, and listens for a secondary acknowledgement beacon signal during the second predetermined period of time in the up-link channel. The secondary acknowledgement beacon signal identifies that the secondary portable unit has successfully received the unoccupied channel identifier (UCID) transmitted by the primary portable unit.

Concurrently, the secondary portable listens for the primary beacon signal during the first predetermined period of time within the down-link channel, and transmits the secondary acknowledgement beacon signal in the second predetermined period of time in the up-link channel upon receiving the primary beacon signal. When the primary portable unit receives the secondary beacon acknowledgement signal, the primary portable unit then begins the exchange of data with the secondary portable unit in the first and second unoccupied channels identified by the unoccupied channel identifier (UCID) as shown in FIG. 4F. When the secondary portable unit receives confirmation that the secondary beacon acknowledgement signal has been received by the primary portable unit, for example, by detecting that the primary portable unit has terminated transmission of the primary beacon signal, the operation of the secondary portable unit continues to begin the exchange of data in the first and second unoccupied channels identified by the unoccupied channel identifier (UCID) as shown in FIG. 4F.

According to an eighth embodiment of the present invention, the functions of the primary and secondary portable units of the TDMA/FDD communication system in the second handshaking operation as described-above with respect to the seventh embodiment may be reversed. In this case, the secondary portable unit scans channels until it finds a pair of unoccupied channels, and records an unoccupied channel identifier (UCID) that identifies the unoccupied channels. The secondary portable unit then transmits a secondary beacon signal that includes the unoccupied channel identifier (UCID) during the second predetermined period of time within the up-link channel, and listens for a primary acknowledgement beacon signal during the first predetermined period of time in the down-link channel. The primary acknowledgement beacon signal identifies that the primary portable unit has successfully received the unoccupied channel identifier (UCID) transmitted by the secondary portable unit.

Concurrently, the primary portable listens for the secondary beacon signal during the second predetermined period of time within the up-link channel, and transmits the primary acknowledgement beacon signal in the first predetermined period of time in the down-link channel upon receiving the secondary beacon signal. When the secondary portable unit receives the primary beacon acknowledgement signal, the secondary portable unit then begins the exchange of data with the primary portable unit in the first and second unoccupied channels identified by the unoccupied channel identifier (UCID). When the primary portable unit receives confirmation that the primary beacon acknowledgement signal has been received by the secondary portable unit, for example, by detecting that the secondary portable unit has terminated transmission of the secondary beacon signal, the operation of the primary portable unit continues to begin the exchange of data in the first and second unoccupied channels identified by the unoccupied channel identifier (UCID).

The embodiments described above advantageously limit the power and time utilized by the primary and secondary portable units of a TDMA/FDD communication system in establishing direct communication by employing a first predetermined period of time within the down-link channel and a second predetermined period of time within the up-link channel to perform the first handshaking operation and, in the case of the seventh and eighth embodiments, to perform the second handshaking operation. Moreover, the standard protocols for communication between the base station and the portable units remain unaffected. And importantly, the physical radio channels of the base station remain unaffected, thereby conserving capacity of the base station that may be utilized for communication between the base station and other portable units.

In another aspect, each portable unit 4 of the radio communication system may be assigned a unique identification number. A peer group, which may be, for example, a group of portable units 4 that belong to colleagues in the same work group, is formed by associating the particular identification numbers of the portable units 4 within the peer group with a group identification number. The identification numbers in the peer group typically belong to the portable units which are usually located within direct radio reach of one another. The peer group information may be input by the user of each portable unit 4 or may be communicated and stored in the portable units 4 utilizing standard control signal techniques.

In this case, to establish communication between primary and secondary portable units, the primary portable unit first determines whether the identification number of the secondary portable unit is part of the peer group(s) associated with the primary portable unit. If there is a positive match, the primary portable unit establishes communication with the secondary portable unit utilizing the steps outlined above. Otherwise, a standard portable-to-base procedure is executed. The advantages of this method is that the base station only carries traffic that is outside of the peer group of the primary portable unit.

Figure 6:
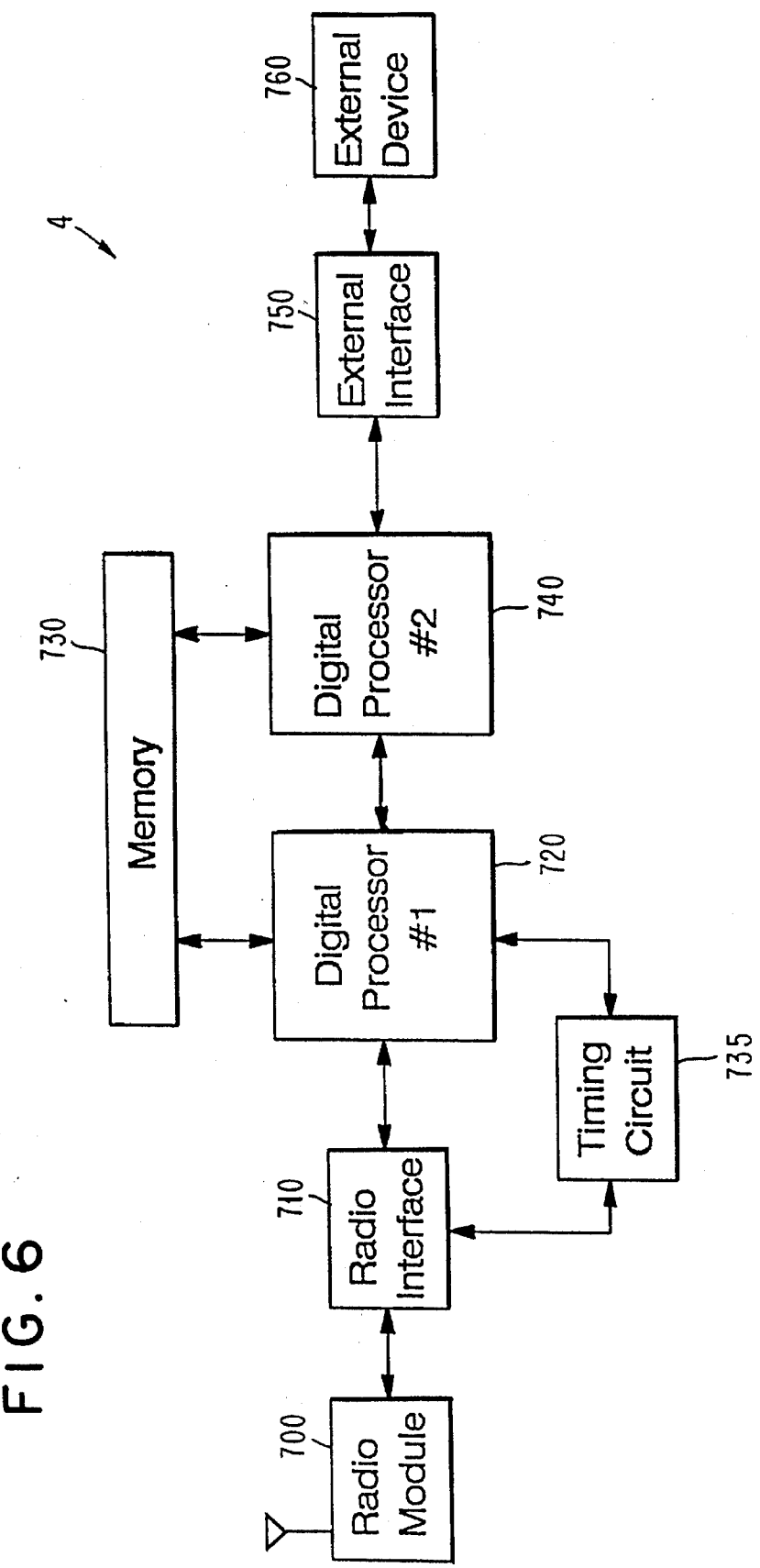
FIG. 6 is a functional block diagram of a portable unit utilizing the in-band TDMA signaling methods of FIGS. 3A–F, FIGS. 4A–F, and 5A–C.

Direct communication between the primary and secondary portable units as described above in the various embodiments of the present invention may be implemented with a portable unit 4 as shown in FIG. 6. The primary and secondary portable units each include a radio module 700 that transmits and receives a TDMA digital data stream of data and control signals over a radio link. A radio interface 710 is coupled between the radio module 700 and a first digital processor 720. The radio interface 710 typically stores the data and control signals to be transmitted, and stores the data and control signals received. The first digital processor 720, under control of a first program which may be stored in memory 730, manages operation of the portable unit 4. The first digital processor 720 may be, for example, a generic microprocessor or a digital signal processing device. In particular, the first digital processor 720 executes the first program to manage operation of the portable unit 4. The management functions performed by the execution of the first program typically include selective activation and control of the modules of the portable unit 4. For example, the execution of the first program by the first digital processor 720 may control the channel frequency tuned to by the radio module 700 for receiving data over the radio link, or may control the channel frequency of the radio module 700 for transmitting data over the radio link.

Synchronization and timing of the portable unit 4 with the received data stream is typically provided by the radio interface 710 and a timing circuit 735. In particular, the radio interface 710 generates a synchronization signal in response to synchronization data in the received data stream. The synchronization signal may represent, for example, successive frames within the received data stream. The synchronization signal generated by the radio interface 710 is provided to the timing circuit 735 that generates timing signals in response to the synchronization signal. The timing signals may represent, for example, one or more predetermined periods of time within each frame of the data stream. The timing signals generated by the timing circuit 735 are provided to the first digital processor 720 for timing and control.

A second digital processor 740 is coupled between the first digital processor and an external interface 750. The second digital processor 740, under control of a second program which may be stored in the memory 730, typically processes data to be transmitted by the radio module 700 and processes data received by the radio module 700. The processing of data by the radio module 700 may include error detection and correction of received data, and formulating and augmenting error detection and correction data to the data stream for transmission. The second digital processor 740 may be, for example, an application specific integrated circuit (ASIC) designed for digital signal processing. Moreover, the functionality of the first and second digital processors 720,740 may be incorporated into a common device. The external interface 750 is coupled to one or more external devices 760 (one shown), which communicates information contained in the received data stream to the user and generates input signals according to user input. The external device 760 may be, for example, a speaker and microphone or a computer system. The external interface 750 conditions the received data processed by the second digital processor 740 to a form discernable by the external device 760. The conditioning of the received data may include, for example, converting the received data from digital to analog form and providing an output signal corresponding to the analog form that is capable of driving the external device 760. The external interface 750 also conditions the input signals generated by the external device 760 to a form discernable by the second digital processor 740. The conditioning of the input signals may include, for example, converting the input signals from analog to digital form.

According to the present invention, in a TDMA/TDD communication system, the first program executed by the first digital processor 720 of the primary and secondary portable units includes routines illustrated in FIGS. 3A–F and FIGS. 5A–C and described above with respect to the first through fourth embodiments. Thus, as shown in FIGS. 3A and 5A, the first program commands the first digital processor 720 of the primary portable unit to control the radio module 700 of the primary portable unit to scan radio channels, and for each radio channel to attempt to locate and synchronize to channel beacons of a base station within the received data stream. When synchronized to base station channel beacons, the timing circuitry 735 of the primary portable unit supplies timing signals to the first digital processor 720 identifying predetermined time periods within the base station channel, such as the turn-around times Tps and Tpr as shown in FIG. 3A. The first program then controls the first digital processor 720 to generate a calling packet CP, forward the calling packet CP to the radio module 700, control the radio module 700 to transmit the calling packet CP during the turn-around time Tps within the base station channel, and listen for an acknowledgment packet AP in the turn-around time Tpr within the base station channel.

The first program of the secondary portable unit commands the first digital processor 720 to control the radio module 700 of the secondary portable unit to periodically wake up, scan radio channels, and for each radio channel attempt to locate and synchronize to channel beacons of a base station within the received data stream. When synchronized to base station channel beacons, the timing circuitry 735 of the secondary portable unit generates timing signals identifying predetermined time periods within the base station channel, such as the turn-around times Tps and Tpr. The first program then controls the first digital processor to determine if a calling packet CP is in the received data stream during the turn-around time Tps. If the calling packet CP has been received in the turn-around time Tps, the first program controls the first digital processor 720 to generate an acknowledgement packet AP, forward the acknowledgement packet AP to the radio module 700, and control the radio module 700 to transmit the acknowledgement packet AP during the turn-around time Tpr within the base station channel.

The second handshaking operation as illustrated in FIGS. 3B–3F and FIGS. 5B–C according to the various embodiments described above is similarly performed under the control of the first program of the primary and secondary portable units.

In a TDMA/FDD communication system, the first program executed by the first digital processor 720 of the primary and secondary portable units includes routines illustrated in FIGS. 4A–F and FIGS. 5A–C and described above with respect to the fifth through eight embodiments. Thus, as shown in FIGS. 4A and 5A, the first program commands the first digital processor 720 of the primary portable unit to control the radio module 700 of the primary portable unit to scan radio channels, and for each radio channel to attempt to locate and synchronize to channel beacons of a base station within the received data stream. When synchronized to base station channel beacons, the timing circuitry 735 of the primary portable unit supplies timing signals to the first digital processor 720 identifying predetermined time periods, such as the times Tps and Tpr as shown in FIG. 4A. The first digital processor 720 thus identifies the current radio channel as the base station down-link channel. The first digital processor 720 then must identify the base-station up-link channel. This may be accomplished in many ways. For example, the base station up-link channel may offset a fixed amount in the frequency domain, or the base station down-link and up-link channel pairs may be fixed and stored in the memory 130. In another implementation, data identifying the base station up-link channel may be included in the received data stream. The first program then controls the first digital processor 720 to generate a calling packet CP, forward the calling packet CP to the radio module 700, control the radio module 700 to transmit the calling packet CP during the time Tps within the base station down-link channel, control the radio module 700 to select the base station up-link channel, and listen for an acknowledgment packet AP in the time Tpr within the base station up-link channel.

The first program of the secondary portable unit commands the first digital processor 720 to control the radio module 700 to periodically wake up, scan radio channels, and for each radio channel attempt to locate and synchronize to channel beacons of a base station within the received data stream. When synchronized to base station channel beacons, the timing circuitry 735 of the secondary portable unit generates timing signals identifying predetermined time periods, such as times Tps and Tpr. The first digital processor 720 thus identifies the current radio channel as the base station down-link channel. The first digital processor 720 then must identify the base-station up-link channel. Again, this may be accomplished in many ways as described above with respect to the primary portable unit. The first program then controls the first digital processor to determine if a calling packet CP is received in the time period Tps within the base station down-link channel. If the calling packet CP has been received, the first program controls the first digital processor 720 to generate an acknowledgement packet AP, forward the acknowledgement packet AP to the radio module 700, control the radio module 700 to select the base station up-link channel, and control the radio module 700 to transmit the acknowledgement packet AP during the time Tpr within the base station up-link channel.

The second handshaking operation as illustrated in FIGS. 4B–4F and FIGS. 5B–C according to the various embodiments described above is similarly performed under the control of the first program of the primary and secondary portable units.

Other embodiments of the invention will be apparent to those skilled in the art from consideration of the specification and practice of the invention disclosed herein. It is intended that the specification and examples be considered as examples only, with the true scope of the invention being indicated by the claims.

We claim:

1. In a communication system wherein communication between a base station and user stations occurs over a plurality of radio channels each having time slots, a method for establishing direct communication between user stations comprising the steps of:

controlling a first user station to locate a first radio channel within said plurality of radio channels wherein communication of data signals and control signals occurs between said base station and at least one user station, synchronizing said first user station with a first predetermined period of time within said first radio channel during which said base station is not transmitting data and not receiving data; and controlling said first user station to transmit a first calling signal during said first predetermined period of time within said first radio channel to establish direct communication between said first user station and a second user station.

2. The method of claim 1, wherein said first predetermined period of time is the turn around time between transmitting and receiving of said base station.

3. The method of claim 1, wherein said first predetermined period of time includes the turn around time between transmitting and receiving of said base station.

4. The method of claim 1, further comprising the steps of:

controlling said second user station to locate said first radio channel;

synchronizing said second user station with said first predetermined period of time and a second predetermined period of time within said first radio channel during which the base station is not transmitting data and not receiving data; and controlling said second user station to transmit a first acknowledgement signal during said second predetermined period of time within said first radio channel upon receiving said first calling signal during said first predetermined period of time.

5. The method of claim 4, wherein said second predetermined period of time is the turn around time between receiving and transmitting of said base station.

6. The method of claim 4, wherein said second predetermined period of time includes the turn around time between receiving and transmitting of said base station.

7. The method of claim 4, wherein said first radio channel has a first frequency, and after said first user station receives said first acknowledgement signal transmitted by said second user station, subsequent communication between said first and second user stations occurs over a second radio channel having a second frequency different than said first frequency, wherein communication of data signals and control signals between said base station and at least one user station does not occur over said second radio channel, and wherein direct communication between other user stations does not occur over said second radio channel.

8. The method of claim 7, further comprising the steps of:

controlling said first user station to locate said second radio channel;

controlling said first user station to transmit a second calling signal during a third predetermined period of time within said second radio channel.

9. The method of claim 8, wherein said first user station transmits data during transmit time slots within said second radio channel and receives data during receive time slots within said second radio channel, and the third predetermined period of time comprises one of said transmit time slots.

10. The method of claim 8, further comprising the steps of:

controlling said second user station to locate said second radio channel;

synchronizing said second user station with said third predetermined period of time and a fourth predetermined period of time within said second radio channel; and controlling said second user station to transmit a second acknowledgement signal during said fourth predetermined period of time within said second radio channel upon receiving said second calling signal during said third predetermined period of time.

11. The method of claim 10, wherein said first user station transmits data during transmit time slots within said second radio channel and receives data during receive time slots within said second radio channel, and said second user station transmits data during said receive time slots within said second radio channel and receives data during said transmit time slots within said second radio channel, wherein the third predetermined period of time comprises one of said transmit time slots, and wherein the fourth predetermined period of time comprises one of said receive time slots.

12. The method of claim 10, further comprising the step of:

exchanging data between said first and second user stations within said second radio channel after said first user station receives said second acknowledgement signal during said fourth predetermined period of time within said second radio channel.

13. The method of claim 12, wherein said first user station transmits data during transmit time slots within said second radio channel and receives data during receive time slots within said second radio channel, and said second user station transmits data during said receive time slots within said second radio channel and receives data during said transmit time slots within said second radio channel, wherein the third predetermined period of time comprises one of said transmit time slots, and wherein the fourth predetermined period of time comprises one of said receive time slots.

14. The method of claim 7, further comprising the steps of:

controlling said second user station to locate said second radio channel;

controlling said second user station to transmit a second calling signal during a third predetermined period of time within said second radio channel.

15. The method of claim 14, wherein said second user station transmits data during transmit time slots within said second radio channel and receives data during receive time slots within said second radio channel, and the third predetermined period of time comprises one of said transmit time slots.

16. The method of claim 14, further comprising the steps of:

controlling said first user station to locate said second radio channel;

synchronizing said first user station with said third predetermined period of time and a fourth predetermined period of time within said second radio channel; and controlling said first user station to transmit a second acknowledgement signal during said fourth predetermined period of time within said second radio channel upon receiving said second calling signal during said third predetermined period of time.

17. The method of claim 16, wherein said second user station transmits data during transmit time slots within said second radio channel and receives data during receive time slots within said second radio channel, and said first user station transmits data during said receive time slots within said second radio channel and receives data during said transmit time slots within said second radio channel, wherein the third predetermined period of time comprises one of said transmit time slots, and wherein the fourth predetermined period of time comprises one of said receive time slots.

18. The method of claim 16, further comprising the step of:

exchanging data between said first and second user stations within said second radio channel after said second user station receives said second acknowledgement signal during said fourth predetermined period of time within said second radio channel.

19. The method of claim 18, wherein said second user station transmits data during transmit time slots within said second radio channel and receives data during receive time slots within said second radio channel, and said first user station transmits data during said receive time slots within said second radio channel and receives data during said transmit time slots within said second radio channel, wherein the third predetermined period of time comprises one of said transmit time slots, and wherein the fourth predetermined period of time comprises one of said receive time slots.

20. The method of claim 4, wherein said first radio channel has a first frequency, further comprising the steps of:

upon receiving said first acknowledgement signal, controlling said first user station to locate a second radio channel having a second frequency different than said first frequency, wherein communication of data signals and control signals between said base station and at least one user station does not occur over said second radio channel, and wherein direct communication between other user stations does not occur over said second radio channel;

controlling said first user station to transmit a channel identification signal identifying said second radio channel during said first predetermined period of time within said first radio channel.

21. The method of claim 20, further comprising the step of:

controlling said second user station to transmit a channel identification acknowledgement signal during said second predetermined period of time within said first radio channel upon receiving said channel identification signal during said first predetermined period of time.

22. The method of claim 21, further comprising the step of:

exchanging data between said first and second user stations within said second radio channel after said first user station receives said channel identification acknowledgement signal during said second predetermined period of time within said first radio channel.

23. The method of claim 4, wherein said first radio channel has a first frequency, further comprising the steps of:

upon confirming receipt of said first acknowledgement signal by said first user station, controlling said second user station to locate a second radio channel having a second frequency different than said first frequency, wherein communication of data signals and control signals between said base station and at least one user station does not occur over said second radio channel, and wherein direct communication between other user stations does not occur over said second radio channel;

controlling said second user station to transmit a channel identification signal identifying said second radio channel during said second predetermined period of time within said first radio channel.

24. The method of claim 23, wherein said second user station confirms receipt of said first acknowledgement signal by detecting that said first user station has terminated transmitting said first calling signal.

25. The method of claim 23, further comprising the step of:

controlling said first user station to transmit a channel identification acknowledgement signal during said first predetermined period of time within said first radio channel upon receiving said channel identification signal during said second predetermined period of time.

26. The method of claim 23, further comprising the step of:

exchanging data between said first and second user stations within said second radio channel after said second user station receives said channel identification acknowledgement signal during said first predetermined period of time within said first radio channel.

27. The method of claim 1, wherein communication of data signals and control signals from said base station to said at least one user station occurs within said first radio channel having a first frequency, wherein communication of data signals and control signals from said at least one user station to said base station occurs within a second radio channel having a second frequency different than said first frequency, further comprising the steps of:

controlling said second user station to locate said first radio channel;

synchronizing said second user station with said first predetermined period of time within said first radio channel and a second predetermined period of time within said second radio channel during which the base station is not transmitting data and not receiving data; and controlling said second user station to transmit a first acknowledgement signal during said second predetermined period of time within said second radio channel upon receiving said first calling signal during said first predetermined period of time.

28. The method of claim 27, wherein after said first user station receives said first acknowledgement signal, subsequent communication from said first user station to said second user stations occurs over a third radio channel having a third frequency different than said first and second frequencies, subsequent communication from said second user station to said first user station occurs over a fourth radio channel having a fourth frequency different than said first, second and third frequencies, wherein communication of data signals and control signals between said base station and at least one user station does not occur over said third and fourth radio channels, and wherein direct communication between other user stations does not occur over said third and fourth radio channels.

29. The method of claim 28, further comprising the steps of:

controlling said first user station to locate said third and fourth radio channels;

controlling said first user station to transmit a second calling signal during a third predetermined period of time within said third radio channel, wherein said second calling signal identifies said fourth radio channel.

30. The method of claim 29, wherein said first user station transmits data during transmit time slots within said third radio channel and receives data during receive time slots within said fourth radio channel, and the third predetermined period of time comprises one of said transmit time slots.

31. The method of claim 29, further comprising the steps of:

controlling said second user station to locate said third radio channel;

synchronizing said second user station with said third predetermined period of time within said third radio channel and a fourth predetermined period of time within said fourth radio channel; and controlling said second user station to transmit a second acknowledgement signal during said fourth predetermined period of time within said fourth radio channel upon receiving said second calling signal during said third predetermined period of time.

32. The method of claim 31, wherein said first user station transmits data during transmit time slots within said third radio channel and receives data during receive time slots within said fourth radio channel, and said second user station transmits data during said receive time slots in said fourth radio channel and receives data during said transmit slots in said third radio channel, wherein the third predetermined period of time comprises one of said transmit time slots, and wherein the fourth predetermined period of time comprises one of said receive time slots.

33. The method of claim 31, further comprising the step of:

exchanging data between said first and second user stations within said third and fourth radio channels after said first user station receives said second acknowledgement signal during said fourth predetermined period of time within said fourth radio channel.

34. The method of claim 33, wherein said first user station transmits data during transmit time slots within said third radio channel and receives data during receive time slots within said fourth radio channel, and said second user station transmits data during said receive time slots in said fourth radio channel and receives data during said transmit time slots within said third radio channel, wherein the third predetermined period of time comprises one of said transmit time slots, and wherein the fourth predetermined period of time comprises one of said receive transmit time slots.

35. The method of claim 28, further comprising the steps of:

controlling said second user station to locate said third and fourth radio channels;

controlling said second user station to transmit a second calling signal during a third predetermined period of time within said fourth radio channel, wherein said second calling signal identifies said third channel.

36. The method of claim 35, wherein said second user station transmits data during transmit time slots within said fourth radio channel and receives data during receive time slots within said third radio channel, and the third predetermined period of time comprises one of said transmit time slots.

37. The method of claim 35, further comprising the steps of:

controlling said first user station to locate said fourth radio channel;

synchronizing said first user station with said third predetermined period of time and a fourth predetermined period of time within said third radio channel; and controlling said first user station to transmit a second acknowledgement signal during said fourth predetermined period of time within said third radio channel upon receiving said second calling signal during said third predetermined period of time.

38. The method of claim 37, wherein said second user station transmits data during transmit time slots within said fourth radio channel and receives data during receive time slots within said third radio channel, and said first user station transmits data during said receive time slots within said third radio channel and receives data during said transmit time slots within said fourth radio channel, wherein the third predetermined period of time comprises one of said transmit time slots, and wherein the fourth predetermined period of time comprises one of said receive time slots.

39. The method of claim 37, further comprising the step of:

exchanging data between said first and second user stations within said third and fourth radio channels after said second user station receives said second acknowledgement signal during said fourth predetermined period of time within said third radio channel.

40. The method of claim 39, wherein said second user station transmits data during transmit time slots within said fourth radio channel and receives data during receive time slots within said third radio channel, and said first user station transmits data during said receive time slots within said third radio channel and receives data during said transmit time slots within said fourth radio channel, wherein the third predetermined period of time comprises one of said transmit time slots, and wherein the fourth predetermined period of time comprises one of said receive time slots.

41. The method of claim 27, further comprising the steps of:

upon receiving said first acknowledgement signal, controlling said first user station to locate third and fourth radio channels, wherein communication from said first user station to said second user station occurs over said third radio channel having a third frequency different than said first and second frequencies, wherein communication from said second user station to said first user station occurs over said fourth radio channel having a fourth frequency different than said first, second and third frequencies, wherein communication of data signals and control signals between said base station and at least one user station does not occur over said third and fourth radio channels, and wherein direct communication between other user stations does not occur over said third and fourth radio channels;

controlling said first user station to transmit a channel identification signal identifying said third and fourth radio channels during said first predetermined period of time within said first radio channel.

42. The method of claim 41, further comprising the step of:

controlling said second user station to transmit a channel identification acknowledgement signal during said second predetermined period of time within said second radio channel upon receiving said channel identification signal during said first predetermined period of time.

43. The method of claim 42, further comprising the step of:

exchanging data between said first and second user stations within said third and fourth radio channels after said first user station receives said channel identification acknowledgement signal during said second predetermined period of time within said second radio channel.

44. The method of claim 27, further comprising the steps of:

upon confirming receipt of said first acknowledgement signal by said first user input station, controlling said second user station to locate third and fourth radio channels, wherein communication from said first user station to said second user station occurs over said third radio channel having a third frequency different than said first and second frequencies, wherein communication from said second user station to said first user station occurs over said fourth radio channel having a fourth frequency different than said first, second and third frequencies, wherein communication of data signals and control signals between said base station and at least one user station does not occur over said third and fourth radio channels, and wherein direct communication between other user stations does not occur over said third and fourth radio channels; and controlling said second user station to transmit a channel identification signal identifying said third and fourth radio channels during said second predetermined period of time within said second radio channel.

45. The method of claim 44, wherein said second user station confirms receipt of said first acknowledgement signal by detecting that said first user station has terminated transmitting said first calling signal within said first radio channel.

46. The method of claim 45, further comprising the step of:

controlling said first user station to transmit a channel identification acknowledgement signal during said first predetermined period of time within said first radio channel upon receiving said channel identification signal during said second predetermined period of time.

47. The method of claim 46, further comprising the step of:

exchanging data between said first and second user stations within said third and fourth radio channels after said second user station receives said channel identification acknowledgement signal during said first predetermined period of time within said first radio channel.

48. The method of claim 1, wherein each user station is assigned a unique identification number that is associated with one or more group identification numbers, wherein said first user station is assigned a first identification number and said second user station is assigned a second identification number, and wherein the step of controlling said first user station to locate said first radio channel is performed after determining that said first identification number and said second identification number are associated with a common group identification number.

49. An apparatus for use in a communication system wherein communication between a base station and user stations occurs over a plurality of radio channels each having time slots, the apparatus comprising:

means for locating a first radio channel within said plurality of radio channels wherein communication of data signals and control signals occurs between said base station and at least one user station, means for synchronizing with a first predetermined period of time within said first radio channel during which said base station is not transmitting data and not receiving data; and means for transmitting a first calling signal during said first predetermined period of time within said first radio channel.

50. The apparatus of claim 49, wherein said first predetermined period of time is the turn around time between transmitting and receiving of said base station.

51. The apparatus of claim 49, wherein said first predetermined period of time includes the turn around time between transmitting and receiving of said base station.

52. An apparatus for use with the apparatus of claim 49, comprising:

means for locating said first radio channel;

means for synchronizing with said first predetermined period of time and a second predetermined period of time within said first radio channel during which the base station is not transmitting data and not receiving data; and means for transmitting a first acknowledgement signal during said second predetermined period of time within said first radio channel upon receiving said first calling signal during said first predetermined period of time.

53. The apparatus of claim 52, wherein said second predetermined period of time is the turn around time between receiving and transmitting of said base station.

54. The apparatus of claim 52, wherein said second predetermined period of time includes the turn around time between receiving and transmitting of said base station.

55. An apparatus for use in a communication system wherein communication between a base station and user stations occurs over a plurality of radio channels each having time slots, wherein communication of data signals and control signals from said base station to said at least one user station occurs within a first radio channel having a first frequency, wherein communication of data signals and control signals from said at least one user station to said base station occurs within a second radio channel having a second frequency different than said first frequency, the apparatus comprising:

means for locating said first radio channel;

means for synchronizing with a first predetermined period of time within said first radio channel during which said base station is not transmitting data and not receiving data; and means for transmitting a first calling signal during said first predetermined period of time within said first radio channel.

56. An apparatus for use with the apparatus of claim 55, comprising:

means for locating said first radio channel;

means for synchronizing with said first predetermined period of time and a second predetermined period of time within said first radio channel during which the base station is not transmitting data and not receiving data; and means for transmitting a first acknowledgement signal during said second predetermined period of time within said first radio channel upon receiving said first calling signal during said first predetermined period of time.

* * * * *